United States Patent
Beeler et al.

(10) Patent No.: US 9,317,970 B2
(45) Date of Patent: Apr. 19, 2016

(54) COUPLED RECONSTRUCTION OF HAIR AND SKIN

(75) Inventors: Thabo D. Beeler, Savognin (CH); Paul Beardsley, Zurich (CH); Robert Sumner, Zurich (CH); Bernd Bickel, Zurich (CH); Steve Marschner, Ithaca, NY (US)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 682 days.

(21) Appl. No.: 13/588,841

(22) Filed: Aug. 17, 2012

(65) Prior Publication Data

US 2012/0313937 A1 Dec. 13, 2012

Related U.S. Application Data

(63) Continuation-in-part of application No. 12/689,170, filed on Jan. 18, 2010, now Pat. No. 8,633,926, and a continuation-in-part of application No. 12/897,518, filed on Oct. 4, 2010, now Pat. No. 8,670,606, which is (Continued)

(51) Int. Cl.
  *G06T 19/00* (2011.01)
  *G06T 17/00* (2006.01)
  *G06T 7/00* (2006.01)
  *H04N 13/00* (2006.01)

(52) U.S. Cl.
  CPC .............. *G06T 19/00* (2013.01); *G06T 7/0077* (2013.01); *G06T 2207/10012* (2013.01); *G06T 2207/20016* (2013.01); *G06T 2207/30201* (2013.01); *H04N 2013/0081* (2013.01)

(58) Field of Classification Search
  CPC ..... G06T 11/00; G06T 11/001; G06T 15/005; G06T 15/06; G06T 15/10; G06T 15/20; G06T 15/40; G06T 15/405; G06T 17/00; G06T 17/20; G06T 19/00
  USPC .................................. 345/418–421, 427, 581
  See application file for complete search history.

(56) References Cited

U.S. PATENT DOCUMENTS

| 6,072,496 A | 6/2000 | Guenter et al. |
| 6,198,486 B1 | 3/2001 | Junkins et al. |

(Continued)

FOREIGN PATENT DOCUMENTS

CN 1342300 A 3/2002

OTHER PUBLICATIONS

Grabli et al., "Image-based hair capture by inverse lighting." In Proceedings of Graphics Interface (GI), pp. 51-58. 2002.*

(Continued)

*Primary Examiner* — Ke Xiao
*Assistant Examiner* — Jed-Justin Imperial
(74) *Attorney, Agent, or Firm* — Patterson + Sheridan, LLP

(57) ABSTRACT

Techniques are provided to model hair and skin. Multiscopic images are received that depict at least part of a subject having hair. The multiscopic images are analyzed to determine hairs depicted. Two-dimensional hair segments are generated that represent the hairs. Three-dimensional hair segments are generated based on the two-dimensional hair segments. A three-dimensional model of skin is generated based on the three-dimensional hair segments.

22 Claims, 18 Drawing Sheets
(13 of 18 Drawing Sheet(s) Filed in Color)

Related U.S. Application Data a continuation-in-part of application No. 12/689,170, filed on Jan. 18, 2010, now Pat. No. 8,633,926.

(60) Provisional application No. 61/310,667, filed on Mar. 4, 2010.

(56) References Cited

U.S. PATENT DOCUMENTS

| | | | |
|---|---|---|---|
| 6,271,847 B1 | 8/2001 | Shum et al. | |
| 6,614,428 B1 | 9/2003 | Lengyel | |
| 6,903,738 B2 | 6/2005 | Pfister et al. | |
| 7,436,988 B2 | 10/2008 | Zhang et al. | |
| 8,633,926 B2 | 1/2014 | Beeler et al. | |
| 8,670,606 B2 | 3/2014 | Beeler et al. | |
| 2002/0024516 A1* | 2/2002 | Chen | G06T 7/0075 345/419 |
| 2002/0106114 A1 | 8/2002 | Yan et al. | |
| 2004/0076313 A1 | 4/2004 | Bronstein et al. | |
| 2004/0105580 A1* | 6/2004 | Hager et al. | 382/154 |
| 2005/0063582 A1* | 3/2005 | Park et al. | 382/154 |
| 2005/0083340 A1 | 4/2005 | Sloan et al. | |
| 2005/0140670 A1 | 6/2005 | Wu et al. | |
| 2006/0028468 A1 | 2/2006 | Chen et al. | |
| 2007/0183653 A1* | 8/2007 | Medioni | G06K 9/00208 382/154 |
| 2007/0185946 A1* | 8/2007 | Basri et al. | 708/200 |
| 2007/0229502 A1 | 10/2007 | Tong et al. | |
| 2007/0296721 A1* | 12/2007 | Chang | G06T 15/10 345/427 |
| 2008/0246765 A1 | 10/2008 | Grenfell | |
| 2009/0052796 A1 | 2/2009 | Furukawa et al. | |
| 2009/0297020 A1 | 12/2009 | Beardsley et al. | |
| 2010/0054579 A1 | 3/2010 | Okutomi et al. | |
| 2010/0128939 A1* | 5/2010 | Stubler | 382/118 |
| 2010/0208034 A1* | 8/2010 | Chen | G06T 7/0022 348/46 |
| 2010/0234871 A1* | 9/2010 | Qureshi et al. | 606/187 |
| 2011/0175900 A1 | 7/2011 | Beeler et al. | |
| 2011/0175912 A1 | 7/2011 | Beeler et al. | |

OTHER PUBLICATIONS

Jakob et al., "Capturing hair assemblies fiber by fiber." ACM Transactions on Graphics (TOG), vol. 28. No. 5. ACM, 2009.*

Paris et al., "Capture of hair geometry from multiple images." In ACM Transactions on Graphics (TOG), vol. 23, No. 3, pp. 712-719. ACM, 2004.*

Sobottka et al., "Hairstyle Construction from Raw Surface Data." Computer Graphics, Imaging and Visualisation, 2006 International Conference, pp. 365,371. Jul. 26-28, 2006.*

Wang et al., "Example-based hair geometry synthesis." In ACM Transactions on Graphics (TOG), vol. 28, No. 3, p. 56. ACM, 2009.*

Wei et al., "Modeling hair from multiple views." In ACM Transactions on Graphics (TOG), vol. 24, No. 3, pp. 816-820. ACM, 2005.*

Wighton et al., "Dermascopic hair disocclusion using inpainting." In Medical Imaging. International Society for Optics and Photonics, 2008.*

Bickel et al., "Multi-Scale Capture of Facial Geometry and Motion", ACM Transactions on Graphics, vol. 26, Issue 3, Article 33, Jul. 2007, 10 pages.

Nehab et al., "Efficiently Combining Positions and Normals for Precise 3D Geometry", ACM Transactions on Graphics, vol. 24, Issue 3, 2005, pp. 536-543.

Bickel et al., Jul. 30-Aug. 3, 2006, "Processing and Editing of Faces using a Measurement-Based Skin Reflectance Model", ACM SIGGRAPH 2006 Sketches (SIGGRAPH '06), ACM, New York, NY, Article 168.

Bickel et al., "Pose-Space Animation and Transfer of Facial Details", Proceedings of the 2008 ACM SIGGRAPH/Eurographics Symposium on Computer Animation (SCA '08), Eurographics Association, Aire-la-Ville, Switzerland, Jul. 7-9, 2008, pp. 57-66.

Blanz et al., "A Morphable Model for the Synthesis of 3D Faces", Proceedings of the 26th annual conference on Computer graphics and interactive techniques (SIGGRAPH '99), ACM Press/Addison-Wesley Publishing Co., New York, NY, USA, 1999, pp. 187-194.

Chen et al., "Mesostructure from Specularity", In CVPR '06: Proceedings of the 2006 IEEE Computer Society Conference on Computer Vision and Pattern Recognition, vol. 2, pp. 1825-1832.

Ben Cloward, "Normal Maps: Part II—Beyond the Basics: Tips for Editing Normal Maps", www.bencloward.com, last updated Jul. 4, 2005, pp. 1-6, published at http://www.benc/oward.com/tutoria/s_norma/_maps12.shtm/.

Dorsey et al., "Advanced Material Appearance Modeling", In ACM SIGGRAPH 2008 classes (SIGGRAPH '08). ACM, New York, NY, USA, Article 5 , 2008, 145 pages.

Gu et al., "Holoimages", Proceedings of the 2006 ACM symposium on Solid and physical modeling (SPM '06), ACM, New York, NY, USA, Jun. 2006, pp. 129-138 and 251.

Gero Muller, "Data-Driven Methods for Compression and Editing of Spatially Varying Appearance", Dissertation, der Rheinischen Friedrich-Wilhelms-Universitat Bonn, Bonn Germany, Dec. 2008, 170 pages.

Pereira et al., "RGBN Image Editing", Proceedings of the 2009 XXII Brazilian Symposium on Computer Graphics and Image Processing (SIBGRAPI '09), IEEE Computer Society, Washington, DC, USA, Oct. 2009, pp. 24-31.

Sander et al., "Silhouette clipping", Proceedings of the 27th annual conference on Computer Graphics and Interactive Techniques (SIGGRAPH '00), ACM Press/Addison-Wesley Publishing Co., New York, NY, USA, 2000, pp. 327-334.

Sorkine et al., "Laplacian Surface Editing", Proceedings of the 2004 Eurographics/ACM SIGGRAPH symposium on Geometry processing (SGP '04). ACM, New York, NY, USA, 2004, pp. 175-184.

Weyrich et al., "Analysis of Human Faces Using a Measurement-Based Skin Reflectance Model", ACM SIGGRAPH 2006 Papers (SIGGRAPH '06), ACM, New York, NY, USA, 2006, pp. 1013-1024.

Zatzarinni et al., "Relief Analysis and Extraction", ACM Transactions on Graphics, vol. 28, Issue 5, Article 136, Dec. 2009, 9 pages.

Boubekeur et al., "Phong Tessellation", ACM Transactions on Graphics, vol. 27, Issue 5, Article 141, Dec. 2008, 5 pages.

Jo Gielis, (May 2007), "Mesostructure From Specularity Using a Raster Display and a Digital Camera", from: http://scholar.google.com/scholar?cluster= 157436113996010637 43&hl=en&as_sdt=0,4 7.

Golovinskiy et al., "A Statistical Model for Synthesis of Detailed Facial Geometry", ACM Transactions on Graphics, vol. 25, Issue 3, Jul. 2006, pp. 1025-1034.

Hertzmann et al., "Shape and Materials by Example: A Photometric Stereo Approach", Proceedings 2003 IEEE Computer Society Conference on Computer Vision and Pattern Recognition, 2003, vol. 1, Jun. 18-20, 2003, 8 pages.

Hiep et al., "Towards High-Resolution Large-Scale Multi-View Stereo", IEEE Conference on Computer Vision and Pattern Recognition, Jun. 2009, CVPR 2009, pp. 1430-1437.

Ma et al., "Facial Performance Synthesis Using Deformation-Driven Polynomial Displacement Maps", ACM Trans. Graph. 27, 5, Article 121, Dec. 2008, 10 pages.

Beeler et al., "High-Quality Single-Shot Capture of Facial Geometry", ACM Transactions on Graphics, vol. 29, No. 4, Article 40, Jul. 2010, pp. 1-9.

Beeler et al., "Improved Reconstruction of Deforming Surfaces by Cancelling Ambient Occlusion", Springer-Verlag Berlin Heidelberg, 2012, pp. 30-43.

Ladikos et al., "Multi-View Reconstruction using Narrow-Band Graph-Cuts and Surface Normal Optimization", BVMC 2008, pp. 1-14.

Beeler, Thabo D. et al., Coupled 3D Reconstruction of Sparse Facial Hair and Skin, The 39th International Conference and Exhibition on Computer Graphics and Interactive Techniques, Aug. 2012, ACM SIGGRAPH, New York, United States.

* cited by examiner

COUPLED RECONSTRUCTION OF HAIR AND SKIN

CROSS-REFERENCE TO RELATED APPLICATIONS

This application is a continuation-in-part of U.S. patent application Ser. No. 12/689,170, filed on Jan. 18, 2010. This application is also a continuation-in-part of U.S. patent application Ser. No. 12/897,518, filed on Oct. 4, 2010, which claims priority to U.S. provisional patent application Ser. No. 61/310,667, filed on Mar. 4, 2010, and which is a continuation-in-part of the aforementioned U.S. patent application Ser. No. 12/689,170. Each of these applications is respectively hereby incorporated herein by reference in its entirety.

BACKGROUND

Recently there has been an increasing demand for three-dimensional (3D) face models. The movie industry relies more and more on computer graphics (CG) to place human actors in situations that are physically not feasible. In some situations, the actor is completely replaced by a corresponding virtual counterpart since the required shots would endanger the actor.

To integrate the actors or their CG representations seamlessly, light and shadows cast from other objects must be matched. Conventional approaches using coarse facial models are not sufficient since the human eye is trained to read faces, so even subtle imperfections are spotted immediately. Also, secondary effects, such as wrinkle formation, are especially hard and tedious to create for an animator or by physical simulation, but these secondary effects are essential for natural face appearance.

Currently, the only practical option is to acquire a model of the face using 3D capture. The acquired models can be either integrated directly into a movie or can be used to control other faces. In addition, the movie industry is not the only industry that demands realistic face models. Computer games have a demand for virtual characters. Also, medical science has an interest in such models.

Conventional approaches to 3D capture may be classified as either depth estimation techniques or normal estimation techniques. The depth variation of mesoscopic skin details, such as pores and wrinkles, is in the micrometer range. Most depth estimation techniques simply cannot achieve that level of detail with current hardware. Laser scanning is capable of recovering depth variations at these scales, but this technology produces insufficient results because of the translucency of skin and/or the time required for the acquisition process. As a workaround, a plaster mold of the face is scanned instead. Each of these depth estimation techniques suffers from various drawbacks, including the cumbersome process of obtaining a plaster mold of the actor's face.

Normal estimation techniques distinguish between diffuse and specular normals that emanate from the surface of an object. The specular normals encode much higher detail than the diffuse normals. The diffuse and specular normals can be estimated based on the light reflected at the surface of the subject. Every normal reflects light from a different direction. Given the direction of the light, the normal may be estimated. Two opposing lines of research exist depending on the direction of the incident light. The first line of research uses a single light source at a known position and known direction. However, to sample the whole space of possible normals, the light has to be moved. Thus, the system is only suited for static scenes. The second line of research places light sources all around the subject. The issue here is to distinguish from which light source the reflected light originates.

Conventional normal estimation techniques rely on polarization to separate the diffuse and specular parts and, thus, suffer from a variety of shortcomings. First, state-of-the-art implementations require up to thirteen frames for one scan. To be able to capture performances, these conventional techniques implement very expensive high-speed cameras. Still, the subject being captured is likely to move slightly during the capture process; thus, sophisticated image registration techniques have to be applied to re-align the captured frames. Furthermore, a short exposure time and the use of polarization significantly increase the amount of illumination required, leading to very high energy consumption and heat issues. Finally, polarization of the light limits conventional approaches to capturing a high-resolution specular normal map from a restricted set of viewpoints.

As the foregoing illustrates, there is a need in the art for an improved technique for capture of high-resolution models, such as high-resolution face models.

SUMMARY

Aspects presented in this disclosure provide a computer-implemented method, computer-readable storage medium, and system to perform an operation that includes receiving multiscopic images depicting a face having facial hair. The operation also includes analyzing the multiscopic images to determine one or more facial hairs depicted in the multiscopic images. The operation also includes generating one or more 3D hair segments representing the determined one or more facial hairs. The operation also includes generating a 3D model of facial skin underlying the one or more facial hairs, based on the generated one or more 3D hair segments.

Aspects presented in this disclosure further provide a computer-implemented method to model filament and surface. The method includes receiving multiscopic images depicting at least part of a target having at least one filament. The method also includes analyzing the multiscopic images to determine one or more filaments depicted in the multiscopic images. The method also includes generating one or more 3D filament segments representing the determined one or more filaments. The method also includes generating a 3D model of surface underlying the one or more filaments, based on the generated one or more 3D filament segments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features presented in this disclosure can be understood in detail, a more particular description of the features, briefly summarized above, may be had by reference to aspects, some of which are illustrated in the appended drawings. It is to be noted, however, that the appended drawings illustrate only typical aspects presented in this disclosure and are therefore not to be considered limiting of its scope, for aspects presented in this disclosure may admit to other equally effective aspects.

DETAILED DESCRIPTION OF EXEMPLARY EMBODIMENTS

Figure 1:
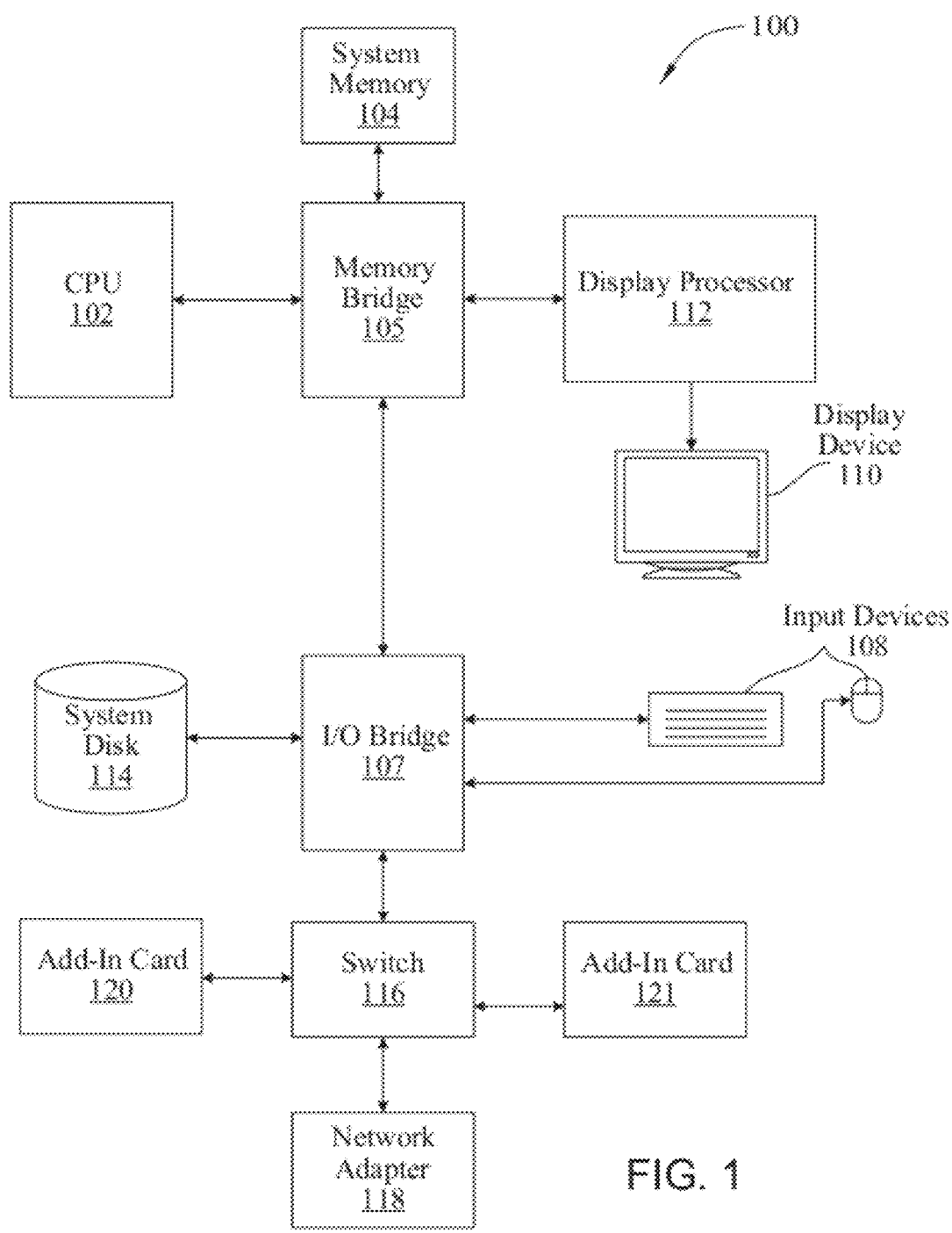
FIG. 1 is a block diagram of a system configured to implement one or more aspects presented in this disclosure.

Aspects disclosed herein provide a technique that adds mesoscopic detail to low-frequency geometry recovered by a reconstruction technique such as stereoscopic reconstruction. In certain aspects, mesoscopic skin details are present within certain bands in the spatial frequency domain. Aspects apply one or more bandpass filters to extract one or more different types of details from the subject. The features are then used to modulate the low-frequency geometry.

One aspect provides a computer-implemented method for generating a three-dimensional model of an object. The method includes generating a coarse geometry mesh of the object using a reconstruction method such as stereo reconstruction; optimizing the coarse geometry mesh based on photometric consistency and surface consistency associated with the coarse geometry mesh; determining a first set of mesoscopic details associated with the object by applying a filter to an image of the object, where mesoscopic details included in the first set of mesoscopic details are detectable in the image of the object and are not reconstructable when generating the coarse geometry mesh of the object; and refining the optimized coarse geometry mesh with the first set of mesoscopic details to generate the three-dimensional model for the object.

Another aspect provides a computer-implemented method for generating a three-dimensional model of an object. The method includes generating a coarse geometry mesh of the object; calculating an optimization for the coarse geometry mesh based on photometric consistency and surface consistency associated with the coarse geometry mesh; and refining the coarse geometry mesh based on the optimization.

In aspects that use stereoscopic reconstruction to recover the low-frequency geometry, the detail is recovered from the same images used for the stereo reconstruction, which is one of the key advantages of this technique over normal estimation. A facial model is then reconstructed from one image per camera. The results are visually close to those produced by current state-of-the-art normal estimation approaches, but with much less cost. Aspects offer thus a low-budget alternative for smaller companies or private persons.

Skin is a complex structure that includes a variety of components. In some aspects, skin can be considered at three different scales: a microscopic scale, a mesoscopic scale, and a macroscopic scale. Skin features in the microscopic scale are not perceivable in images captured by cameras, while the macroscopic scale is too coarse to be suited for detailed features. At the mesoscopic scale, features may be classified into two groups. A first group is based on color variation. Spots, freckles, and moles are examples of the first group of mesoscopic scale features. A second group is based on geometric variation. Pores, fine wrinkles, and facial hair belong to this group. In some aspects, each of the features in the first and second groups lies in a particular range of the spatial frequency spectrum of an image.

Thus, according to aspects presented herein, mesoscopic features can be extracted from an image based on the spatial frequency content of the image. In some aspects, mesoscopic features are those features that are perceptible in an image of an object, but are not measurable in the coarse geometry that results from performing stereo reconstruction, such as stereo reconstruction, of the object. In some aspects, the coarse geometry may include larger scale features of the object than the mesoscopic features. For example, pore information can be extracted from an image. Pores cover the face in a very regular fashion and are well suited as features for image registration. Additionally, pores are typically isotropic (i.e., symmetrical along each axis). In one aspect, an image can be filtered by an appropriately selected bandpass filter. The result can be further filtered with a Laplacian filter and a non-maxima suppression algorithm to find the location of the mesoscopic details. As a last step, aspects may weight feature candidates by the response of the Laplacian. Other isotropic features, such as pimples, can be extracted in a similar fashion, while anisotropic features, such as wrinkles, may require different filters.

System Overview

FIG. 1 is a block diagram of a system 100 configured to implement one or more aspects disclosed herein. System 100 may be a computer workstation, personal computer, video game console, personal digital assistant, rendering engine, mobile phone, or any other device suitable for practicing one or more aspects presented in this disclosure.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one aspect display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one aspect, display processor 112 incorporates circuitry optimized for graphics and video processing, including, for example, video output circuitry, and constitutes a graphics processing unit (GPU). In another aspect, display processor 112 incorporates circuitry optimized for general purpose processing. In yet another aspect, display processor 112 may be integrated with one or more other system elements, such as the memory bridge 105, CPU 102, and I/O bridge 107 to form a system on chip (SoC). In still further aspects, display processor 112 is omitted and software executed by CPU 102 performs the functions of display processor 112.

Pixel data can be provided to display processor 112 directly from CPU 102. In some aspects, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an aspect, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some aspects, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other aspects, I/O bridge 107 and memory bridge 105 might be integrated into a single chip. The particular components shown herein are optional; for instance, any number of add-in cards or peripheral devices might be supported. In some aspects, switch 116 is eliminated, and network adapter 118 and add-in cards 120, 121 connect directly to I/O bridge 107.

According to aspects disclosed herein, mesoscopic features can be extracted from an image based on the spatial frequency content of the image. Certain aspects may be implemented in software stored in system memory 104 and executed by CPU 102 and/or display processor 112. Other aspects may be implemented as one or more shader programs executed by display processor 112. Still further aspects may be implemented in fixed function hardware included within display processor 112. Other aspects may be implemented as a combination of hardware and software.

Mesoscopic Geometry Modulation

Figure 2:
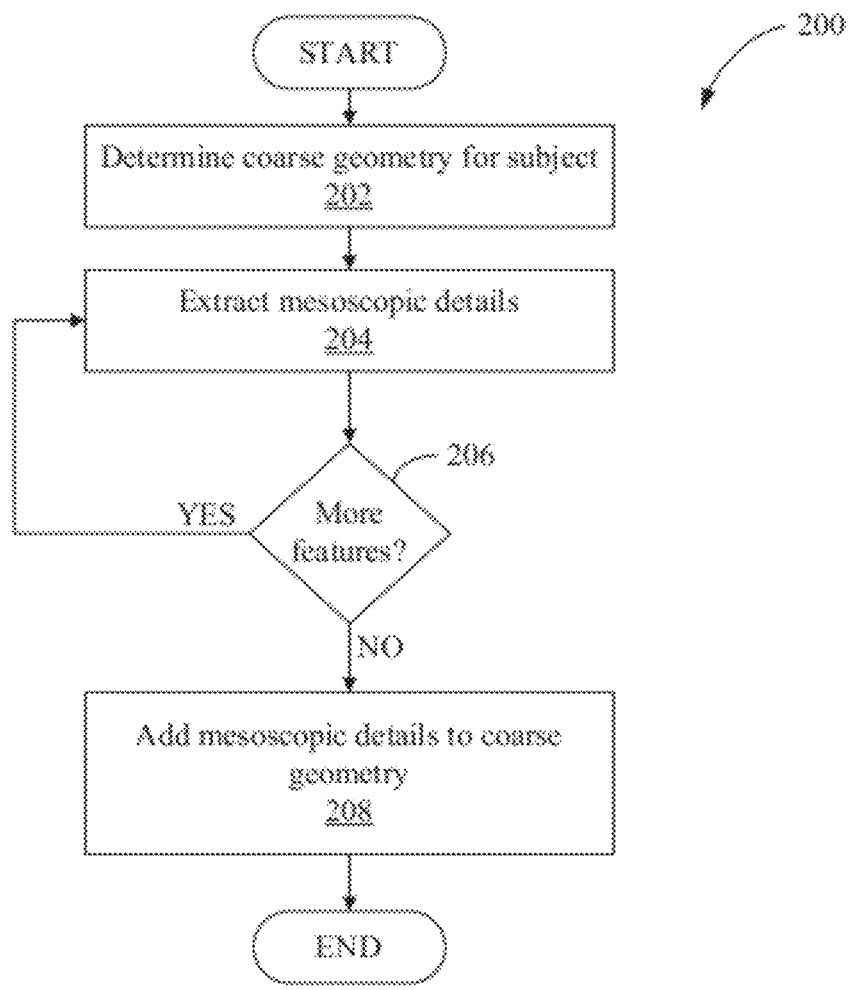
FIG. 2 is a flow diagram of method steps for recovering mesoscopic details when capturing and reconstructing a subject, according to one aspect disclosed herein.

FIG. 2 is a flow diagram of method steps for recovering mesoscopic details when capturing and reconstructing a subject, according to one aspect disclosed herein. Persons skilled in the art will understand that, even though the method 200 is described in conjunction with the system of FIG. 1, any system configured to perform the method steps, in any order, is within the scope of aspects disclosed herein.

As shown, the method 200 begins at step 202, where a processor determines a coarse geometry for a subject. In one aspect, the subject is a human head, and a coarse geometry for the human head includes a general shape of the head, providing a shape for the major features, such as a nose, ears, eyes, mouth, among others. Mesoscopic details (e.g., pores, imperfections, hair, among others) are not included in the coarse geometry. For example, the coarse geometry may provide a plastic-looking and/or "waxy" geometry for the subject.

Figure 3A:
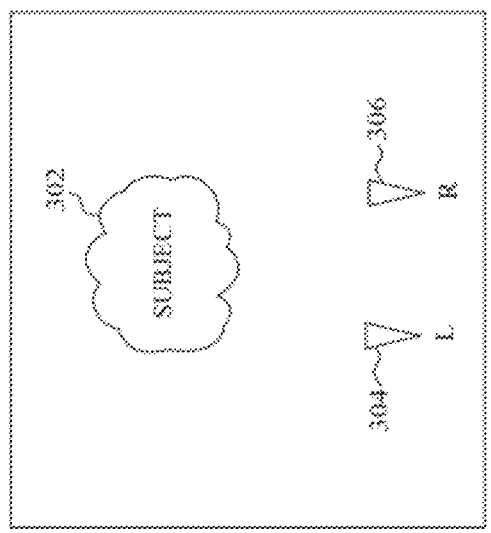
FIG. 3A is a conceptual diagram illustrating capturing a subject using two cameras, according to one aspect disclosed herein.
Figure 3B:
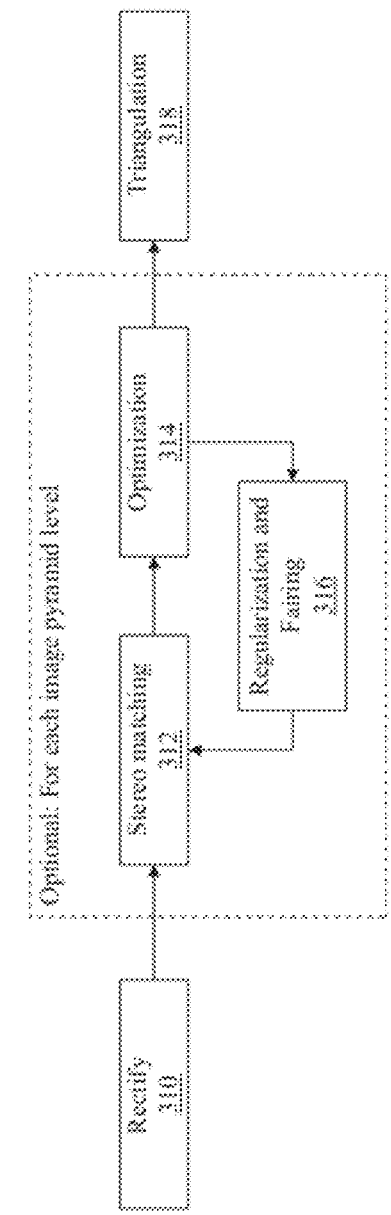
FIG. 3B is a flow diagram of method steps for performing stereo reconstruction, according to one aspect disclosed herein.

In one aspect, the coarse geometry is determined using (multi-view) stereo reconstruction, as described in FIG. 3B. In other aspects, any other technically feasible technique for determining the coarse geometry may be implemented.

Stereo reconstruction involves finding correspondences between two images of a subject. Once the corresponding pixel and/or sub-pixel locations are determined between the two images, the reconstruction can be easily achieved. Image registration has been an intense field of research over the past several decades, not only for stereo reconstruction but also optical flow analysis, medical imaging, and others. During this time, many different techniques have been proposed.

FIG. 3A is a conceptual diagram illustrating capturing a subject 302 using two cameras 304, 306, according to one aspect disclosed herein. As shown, camera 304 captures the subject 302 from the left; whereas, camera 306 captures the subject 320 from the right. In some aspects, the images for cameras 304, 306 may be captured simultaneously to reduce temporal discontinuities. From the resultant images, stereo reconstruction may be implemented to generate the coarse geometry for the subject 302.

FIG. 3B is a flow diagram of method steps for performing stereo reconstruction, according to one aspect disclosed herein. Persons skilled in the art will understand that, even though the method 300 is described in conjunction with the systems of FIGS. 1 and 3A, any system configured to perform the method steps, in any order, is within the scope of aspects disclosed herein.

As shown, the method 300 begins at step 310, where a processor rectifies the images. Stereo reconstruction involves finding correspondences between points in one image and points in another image. For example, for a given point p in image I, stereo reconstruction involves finding corresponding point q in image J. Aspects disclosed herein operate with a calibrated setup; thus, the search range can be constrained to one dimension. This constraint is called epipolar constraint and states that the corresponding point q in image J for a point p in image I has to lie on the epipolar line, and vice versa. The matching becomes especially simple when these lines correspond to the same rows in the images, which is achieved with rectification.

At step 312, the processor performs stereo matching. In one aspect, a block-based matching algorithm may be used (also called a patch-based or area-based matching algorithm). The matching quality is computed for all possible correspondences $q_i$ via an error functions and the correspondence with lowest error is selected. Commonly used error functions include the Sum of Squared Distances (SSD), the Sum of Absolute Differences (SAD), or cross-correlation. Additional improvements may be implemented in the stereo matching algorithm, such as adding constraints, bi-directional matching, and sub-pixel matching. Still further, some aspects may include a matching quality metric that ensures that correspondences have low error and good localization.

At step 314, the processor performs optimization. In some aspects, stereo matching provides only a coarse initial estimation of a disparity map. This map may also include entire patches of outliers, especially at discontinuities or regions visible to only one of the cameras. One or more additional processing steps may be performed to optimize the disparity map, including patch filling and discontinuity relocation.

In one aspect, the optimization is defined as an iterative refinement of the disparity d using photometric consistency and surface-consistency. The optimization is performed both on the disparity map and later on the surface. Both optimizations may be implemented as iterative processes. In some aspects, the optimizations preserve the volume and converge quickly to the desired solution. Since the convergence is close to exponential at the beginning, aspects terminate the optimization before convergence is reached to strike a balance between quality and computational effort. This is especially valuable for lower resolution layers of a disparity pyramid, as described below, since the next higher level is going to refine the disparities anyway and some aspects, therefore, need only to eliminate the gross errors.

1. Disparity Map Optimization

In one aspect, the disparity values are updated in every iteration as a linear combination of $d_p$ and $d_s$, where $d_p$ is an adjustment in the direction of improved photometric-consistency, and $d_s$ is an adjustment in the direction of improved surface-consistency.

Compute $d_p$—Given a current pixel p in image I and its match q in image J, aspects compute the normalized cross-correlation (NCC) of p with q−1, q, q+1, where the offsets indicate the left-neighbors and right-neighbors of q. The respective NCCs are labeled $\xi_{-1}, \xi_0, \xi_{+1}$, and $d_p$ is calculated as:

$$d_p = p - q + \begin{cases} -0.5 & \xi_{-1} < \xi_0, \xi_{+1} \\ 0.5 \dfrac{(\xi_{-1} - \xi_{+1})}{\xi_{-1} + \xi_{+1} - 2\xi_0} & \xi_0 < \xi_{-1}, \xi_{+1} \\ +0.5 & \xi_{+1} < \xi_{-1}, \xi_0. \end{cases} \quad \text{(Equation 1)}$$

Compute $d_s$—The formulation of surface-consistency has been designed for human faces, where disparity varies smoothly with just a few depth discontinuities. Some aspects use anisotropic kernels, which adapt to the local gradient to avoid smoothening across boundaries. For human faces, however, regions of high gradient are mostly due to different foreshortening of the camera pairs and smoothening should not be attenuated within these regions. Aspects employ second-order properties, but use them within an anisotropic formulation over a two-dimensional domain. The equation can be discretized as:

$$d_s = \frac{w_x(d_{x-1,y} + d_{x+1,y}) + w_y(d_{x,y-1} + d_{x,y+1})}{2(w_x + w_y)}, \quad \text{(Equation 2)}$$

where $w_x = \exp(-(|d_{x-1,y} - d_{x,y}| - |d_{x+1,y} - d_{x,y}|)^2)$. These weights render the harmonic equation anisotropic, reducing smoothing across depth discontinuities.

Compute d'—In one aspect, d' is defined as $d' = (w_p d_p + w_s d_s)/(w_s + w_p)$, where $w_s$ is a user-specified weighting scalar that controls the smoothness and $w_p$ is $$w_p = \begin{cases} \xi_0 - \xi_{-1} & \xi_{-1} < \xi_0, \xi_{+1} \\ 0.5(\xi_{-1} + \xi_{+1} - 2\xi_0) & \xi_0 < \xi_{-1}, \xi_{+1} \\ \xi_0 - \xi_{+1} & \xi_{+1} < \xi_{-1}, \xi_0. \end{cases} \quad \text{(Equation 3)}$$

This gives a higher-weighting to the photometric term in textured areas of the image where the image data is most informative about feature localization.

2. Surface Optimization

The surface optimization differs from the disparity map optimization in that aspects optimize in continuous 3-space. To keep computation tractable, aspects restrict the optimization to along the normal direction n at X and define an optimization resolution δ (usually 0.1 mm). This, then, results in a discrete one-dimensional optimization, and aspects proceed in a manner analogous to the disparity map optimization, by iterating over all points and computing updates for X as a linear combination of $X_p$ and $X_s$, where $X_p$ is an adjustment in the direction of improved photometric-consistency, and $X_s$ is an adjustment in the direction of improved surface-consistency.

Compute $X_p$—Aspects generate the points $X_{-\delta} = X - \delta n$ and $X_{+\delta} = X + \delta n$. Aspects define as reference view the camera with the least foreshortened view of X. Then, aspects measure a photo-consistency error for a point by taking the NCC between an x-by-x patch (e.g., x may be equal to 3) centered at the projection in the reference image and the corresponding patches in all the other images. Given error values for $X_{-\delta}$, $X_0$, and $X_{+\delta}$, aspects compute $\delta_p$ analogously to $d_p$.

Compute $X_s$—The surface-consistency estimate $X_s$, is computed using mean-curvature flow, using known techniques.

Compute X'—Compute $X' = (w_p X_p + w_s X_s)/(w_p + w_s)$ where $w_p$ and $w_s$ are, in some aspects, the same as in the disparity map optimization computation.

At step 316, the processor performs regularization and fairing. Regions only visible to one camera are likely to not be recovered by the optimization techniques performed at step 314, since those techniques rely on mutual information from both cameras. These drawbacks can be overcome by performing regularization and fairing. In some aspects, regularization propagates information into regions that could not be matched, and fairing attenuates noise while preserving the essential features.

Additionally, to speed up computation and to be more robust with respect to noise, some aspects perform the reconstruction over multiple scales using an "image pyramid." The image pyramid may include a predefined number of layers, where each layer is a sub-sampled version of the next lower layer. The bottom layer is the original image. Some aspects sub-sample the images by a factor of two. To avoid aliasing, a low-pass filter may be applied to the images with a Gaussian. Let $\Delta_I$ denote the image pyramid for image I. The image pyramid includes $|\Delta_I| - 1$ layers, with layer 0 comprising the original image. To express the dependency on a layer, aspects use superscripts. Furthermore, two operators are introduced that relate the individual layers. The lifting operator ↑ lifts a pixel from layer l to the next higher layer (l+1) and the refinement operator ↓ takes the pixel in the opposite direction:

$$\uparrow(p^l) = s^{-1} p^l$$

$$\downarrow(p^l) = s p^l,$$

where s is the sub-sampling factor. Given two image pyramids ($D_I$ and $D_J$), the following pseudo-code in Table 1 defines an algorithm for fining the point q in image J that corresponds best to point p in image I:

TABLE 1

Require: Image Pyramids $D_I$ and $D_J$, point p
Ensure: q
   $p^0 := p$
   $p^{|\Delta_I|-1} := \uparrow (p^0)^{|\Delta_I|-2}$ {Lift p to the top layer}
   find the corresponding point $p^{|\Delta_J|-1}$ for $p^{|\Delta_I|-1}$ on the top layer
   for l = $|\Delta_I|-2$ to 0 do
      $p^l := \downarrow (p^{l+1})$
      $q^l := \downarrow (q^{l+1})$
      update $q^l$ with the image on layer l
   end for
   q := $q^0$ At step 318, the processor performs triangulation to reconstruct the coarse geometry of the subject. Any technically feasible approach may be implemented to perform step 318, including computing an intersection of two rays or performing a least squares computation.

Again, as described above, the method 300 illustrated in FIG. 3B involving stereoscopic reconstruction provides only one technique for determining the coarse geometry for the subject (i.e., step 202 in FIG. 2). Any other technique for determining a coarse geometry for the subject is also within the scope of aspects disclosed herein.

Referring back to FIG. 2, at step 204, the processor applies a band pass filter to extract mesoscopic details. As described above, the mesoscopic details contribute to the high spatial frequency content of the captured images. The technique of applying a band pass filter to extract the mesoscopic details is based on the observation that the shading in the image space is associated with the geometry of the subject. Based on this observation, aspects present heuristics to extract the mesoscopic detail from the captured images.

According to various aspects, each different mesoscopic detail may be associated with a different band of frequencies. For example, pores may be associated with a first band of frequencies, and facial hair may be associated with a second band of frequencies. Other bands of frequencies may be associated with other mesoscopic details, such as spots, freckles, moles, and/or fine wrinkles, among others. A separate band pass filter may be applied to the image to extract the details associated with a particular mesoscopic feature (e.g., pores).

Additionally, in some aspects, the frequency band of a particular mesoscopic feature may be determined empirically based on knowledge of the resolution of the image, how close the subject is to the camera, and/or the size of the mesoscopic feature (e.g., average pore size). Alternatively, in other aspects, the frequency band or range of a particular mesoscopic feature may be calculated automatically for each image being processed using a detection algorithm.

As described, the mesoscopic skin details may be extracted from images with a bandpass filter, such as:

$$\delta = s(I * f_\mu),$$

where $f_\mu$ is the bandpass filter and s is a scaling factor that controls the emboss strength of the high-frequency feature. For example, a first scale factor can be used when applying a first bandpass filter associated with a first mesoscopic feature (e.g., pores), and a second scale factor can be used when applying a second bandpass filter associated with a second mesoscopic feature (e.g., facial hair). Based on the relative strength or weakness of the scaling factors, the emboss strength of a particular feature can be accentuated or diminished. For example, applying a larger scaling factor for a first mesoscopic feature causes that feature to be more prominent in the resultant reconstruction.

At step 206, the processor determines if any other features should be extracted. If the processor determines that at least one other feature should be extracted from the images, then the method 300 returns to step 204, described above. Again, according to aspects disclosed herein, each separate mesoscopic feature falls in a different band of spatial frequencies. Thus, the feedback loop between steps 206 and 204 allows aspects to capture two or more different types of mesoscopic details in a single reconstruction. If, at step 206, the processor determines that no more features are to be extracted from the images, then the method 200 proceeds to step 208.

At step 208, the processor adds the mesoscopic detail(s) to the coarse geometry. In one aspect, a normal displacement technique may be implemented to add the mesoscopic detail (s) to the coarse geometry, as described in FIGS. 4A-4D. In other aspects, any other technically feasible technique may be implemented.

Figure 4A:
FIG. 4A is a conceptual illustration of mesoscopic details, according to one aspect disclosed herein.

FIG. 4A is a conceptual illustration of mesoscopic details 402, according to one aspect disclosed herein. In the example shown in FIG. 4A, the mesoscopic details 402 represent pores on skin. For example, the relative spacing of the mesoscopic details 402 represents the spacing of the pores, and the relative depth represents a depth of the pores. Again, as described in FIG. 2, these mesoscopic details are derived from the spatial frequencies in image space. In some aspects, the spacing of the mesoscopic features corresponds to the physical spacing of those features in the subject. However, the depth of the mesoscopic features is not physically accurate.

Figure 4B:
FIG. 4B is a conceptual illustration of coarse geometry, according to one aspect disclosed herein.

FIG. 4B is a conceptual illustration of a coarse geometry 404, according to one aspect disclosed herein. The coarse geometry 404 may have been determined using the stereo reconstruction technique described in FIG. 3B. In other aspects, the coarse geometry 404 may have been determined using any technically feasible technique. For example, the coarse geometry 404 may represent the tip of a nose.

Figure 4C:
FIG. 4C is a conceptual illustration of the mesoscopic details applied to the coarse geometry with disparity displacement, according to one aspect disclosed herein.

FIG. 4C is a conceptual illustration of the mesoscopic details 402 applied to the coarse geometry 404 with disparity displacement, according to one aspect disclosed herein. As shown, the relative spacing of the mesoscopic details shown in FIG. 4C corresponds to the spacing of mesoscopic details 402 in FIG. 4A. However, as also shown, the pores extend directly downwards in FIG. 4C, regardless of the surface normal at that particular surface location on the coarse geometry 404.

Figure 4D:
FIG. 4D is a conceptual illustration of the mesoscopic details applied to the coarse geometry with normal displacement, according to one aspect disclosed herein.

FIG. 4D is a conceptual illustration of the mesoscopic details 402 applied to the coarse geometry 404 with normal displacement, according to one aspect disclosed herein. As shown, the relative spacing of the mesoscopic details shown in FIG. 4D corresponds to the spacing of mesoscopic details 402 in FIG. 4A. Additionally, the mesoscopic details shown in FIG. 4D are aligned with the surface normal at each particular surface location on the coarse geometry.

Modeling of Mesoscopic Geometry

The surface optimization technique described above results in a surface geometry that is smooth across skin pores and fine wrinkles since the disparity change across such a feature is too small to detect. The result is a flatness and lack of realism in synthesized views of the face. On the other hand, visual inspection shows the presence of pores and fine wrinkles in the images. The technique disclosed below uses image texture to emboss the recovered 3D geometry. The technique is qualitative and the geometry that is recovered is not metrically correct. However, modulation of the macroscopic geometry with fine-scale features does produce a significant improvement of the perceived quality of synthesized faces.

For this mesoscopic optimization we are only interested in features that are too small to be recovered by the reconstruction algorithm (e.g., implemented at step 202). Aspects first compute high-pass filtered values $\mu$ for all points X using the projection of a Gaussian N:

$$\mu(X) = \frac{\sum_{c \in v} \alpha_c (I_c(x) - [N_{\Sigma_c} \otimes I_c](x))}{\sum_{c \in v} \alpha_c}, \quad \text{(Equation 4)}$$

where $v$ denotes the set of visible cameras and the weighting term $\alpha$ is the foreshortening. In some aspects, the variance is chosen in dependence of the matching window m. In other aspects, the variance can be empirically determined, for example by measuring the size of the mesoscopic features.

The mesoscopic values $\mu$ are then used to compute $X_\mu = X + \delta_\mu n$ over the neighborhood R with:

$$\delta_\mu = -\eta \frac{\sum_{i \in R} w_i \left(1 - \frac{|\langle X - X_i, n \rangle|}{\|X - X_i\|}\right)(\mu(X_i) - \mu(X))}{\sum_{i \in R} w_i}, \quad \text{(Equation 5)}$$

where the weights are computed by a radial basis function such as $w_i = \exp(-|X - X_i|)$ and $\eta$ is the embossing strength. The update of the 3D point now uses all three adjusted points $X_p$, $X_s$ and $X_\mu$ to compute $X' = (w_p X_p + w_s X_s + w_\mu X_\mu)/(w_p + w_s + w_\mu)$. The weights $w_p$ and $w_s$ are the same as in the surface optimization calculation, described above, and $w_\mu$ is defined as $$w_\mu = \rho \frac{3\xi_0}{\delta(\xi_{-\delta} + \xi_0 + \xi_{+\delta})}, \quad \text{(Equation 6)}$$

with ρ being a user-specified term that controls the influence of the mesoscopic term. Pseudo code describing this technique is provided in Table 2, below. The disparity map optimization calculation and the surface optimization calculation, described above, are similar and of less complexity that the algorithm put forth in Table 2 since the mesoscopic term is not present in those optimizations. The function in Table 2 computes the position update X' for X using the normal n. In one example, the parameters and may have values of: resolution δ=0.05 in mm, surface smoothness λ=0.03, mesoscopic weight ρ=0.07 and embossing strength η=0.2.

TABLE 2

```
X' = optimizePointMesoscopic(X; n; δ; λ; ρ; η)
ξ_−1 = (1-NCC(X − δn))/2
ξ_0  = (1-NCC(X))/2
ξ_+1 = (1-NCC(X + δn))/2
if ξ_−1 < ξ_0, ξ_+1 then
    δ_p = −0.5δ
    w_p = (ξ_0 − ξ_−1)/δ
else if ξ_+1 < ξ_−1, ξ_0 then
    d_p = −0.5δ
    w_p = (ξ_0 − ξ_+1)/δ
else
    δ_p = 0.5(ξ_−1 − ξ_+1)/(ξ_−1 + ξ_+1 − 2ξ_0)δ
    w_p = 0.5(ξ_−1 + ξ_+1 − 2ξ_0)/δ
end if
δ_s = −κ̄n
w_s = λ

∑_{i∈R} exp(−‖X − X_i‖)(1 − |⟨X − X_i, n⟩|/‖X − X_i‖)(μ(X_i) − μ(X))
δ_μ = −η ─────────────────────────────────────────────────────────────────────
                        ∑_{i∈R} exp(−‖X − X_i‖)

w_μ = 3 ρξ_0/δ(ξ_−δ + ξ_0 + ξ_+δ)
X' = X + (w_p δ_p + w_s δ_s + w_μ δ_μ)/(w_p + w_s + w_μ)n
```

Thus, aspects disclosed herein offer an alternative technique for high-resolution scanning in situations where visual plausibility, and not physical correctness, is the main goal. Aspects disclosed herein operate using the same data used for stereo reconstruction, which includes a single image per viewpoint. Thus, the setup required to implement aspects disclosed herein is relatively inexpensive. The quality of the results, however, is sufficient for computer games and also for movies.

In some aspects, additional improvements may be added to the techniques described herein to further improve the quality of the captured 3D model. As described, different frequency-bands are associated with different details. Thus, instead of just modulating the surface with one band of spatial frequencies, multiple bands of frequencies could be used to convey certain structure. The same effects could be achieved by using more sophisticated filters other than just bandpass filters. Additionally, in some aspects, normal estimation at grazing angles could be employed to estimate the emboss direction of mesoscopic features. If the detail contains enough geometric variation, then the normals enclose grazing angles at some point. It is not necessary to estimate the normals, but only the variation in the normals to identify geometric detail. This variation could then be used to separate geometric and texture detail as well as the emboss direction. Another option could be to learn the features and their emboss direction with machine learning techniques following shape-from-shading approaches.

In sum, mesoscopic geometry modulation produces results which are visually close to the ones produced by current state-of-the-art normal estimation approaches, but with much less cost. Any system that can capture coarse geometry and high-resolution images can be used to improve the coarse geometry with the addition of fine details. However, since the mesoscopic details of the reconstruction are based on spatial frequency variation in image space and not actual geometric features, the mesoscopic details are not physically accurate. The results, however, are still visually pleasing. To the human observer, the results of applying aspects presented herein are much more realistic-looking than simply using the coarse reconstruction, which appears waxy and inhuman.

Additionally, as should be apparent to those having ordinary skill in the art, aspects disclosed herein can be applied to any subject, not just human faces. As long as a frequency band is determined (either pre-determined, derived analytically, or calculated empirically) for the mesoscopic features of the subject, then aspects can be used to generate a 3D model that includes the mesoscopic features. For example, the fine lines and wrinkles of foliage may be captured using the techniques described herein.

One advantage of aspects disclosed herein is the ability to produce plausible-looking high-quality facial scans from the same two images required for stereo reconstruction. Another advantage is that these techniques present a low-cost option for applications where visual plausibility is the main focus. Yet another advantage is that aspects disclosed herein are easily implemented in a shading program on a GPU.

In one aspect, the processor is further configured to reconstruct, using techniques disclosed herein, filament and surface of a target. In one embodiment, the filament of the target refers to any strand-like or thread-like structure adjoining the surface of the target. Examples of filament adjoining the surface include hair and underlying skin, blades of grass and an underlying mound of soil, and other material types without departing from the scope of the present disclosure. For purposes of illustration, and without limitation, embodiments will be described herein with respect to hair and underlying skin. In one embodiment, the hair and underlying skin belong to a subject, where the subject is any biological organism that is living or deceased, any artificial, physical model of a biological organism, or any artificial, physical model of a fictional or imaginary organism. In some embodiments, for example, the techniques disclosed herein may be used to reconstruct facial hair and underlying facial skin in a geometric 3D model of a face of a human subject or other living being. And although embodiments are described herein with respect to reconstructing facial hair and underlying facial skin of a human subject, other embodiments are broadly contemplated. In particular, those skilled in the art will recognize that the techniques disclosed herein may be adapted to reconstruct hair and skin in areas other than the face and for organisms other than human beings, including artificial, physical models thereof. Accordingly, any reference to reconstructing facial hair and skin of a human are merely exemplary and are not intended to limit the scope of the present disclosure.

At least in some aspects, the techniques incorporate facial hair and skin as separate but interrelated components. Put another way, facial hair and skin are reconstructed in a coupled manner to improve the quality and/or accuracy of the reconstructed facial hair and/or skin at least in some cases, relative to alternative approaches of reconstructing facial hair and/or skin. Examples of alternative approaches include generating facial models without differentiating facial hair from facial skin and generating each of facial hair and skin in isolation from one another. For instance, a facial model that is generated without differentiating facial hair from facial skin may produce a 3D model having a skin surface that appears to be "shrink-wrapped" on top of facial-hair features—rather than reconstructing the facial-hair features as individual fibers on top of the skin surface. A generated skin surface that is tightly overlaid on all facial hair is referred to herein as a shrink-wrapped surface.

To reconstruct facial hair and skin, the processor performs an operation that includes receiving a source multiscopic frame depicting a face having facial hair. At least in some aspects, the multiscopic frame corresponds to single point in time of a video sequence. In other aspects, the multiscopic frame is generated by image capture at a single point in time and is not part of any video sequence. For example, the multiscopic frame may be generated using a single-shot capture system that includes digital cameras, without needing multiple exposures or active illumination. The count of digital cameras may be tailored to suit the needs of a particular case. For instance, additional digital cameras may be added to increase the coverage area of the face during image capture. At least in some aspects, images captured during a single point in time are sufficient to reconstruct the facial hair and skin using the techniques disclosed herein.

As used herein, a frame at a given point in time may include one or images corresponding to the given point in time. When a frame includes multiple images that together facilitate determining, via a predefined technique such as triangulation, three-dimensional depth of the frame, such multiple images are referred to as multiscopic images of the frame. Depending on the embodiment, the determined three-dimensional depth may be perceived by a human observer or computed by a processor. Although aspects are described herein with reference to using a single multiscopic frame to reconstruct facial hair and skin, in alternative aspects, more than one multiscopic frame may be used in reconstructing facial hair and/or skin. Multiscopic images of a frame may also be referred to herein as multiscopic views, or views. In cases where there are two multiscopic images to a frame, the two multiscopic images may also be referred to as stereoscopic images, or a stereoscopic image pair. A single frame may also have multiscopic images numbering greater than two.

In one aspect, each multiscopic image may be obtained via image capture or generated programmatically, such as via 3D rendering. For instance, a set of ten multiscopic images may be obtained from ten cameras, each providing a distinct viewpoint of a scene. Alternatively, the set of ten multiscopic images may be generated via 3D rendering and without the use of any cameras. In some embodiments, a multiscopic image may also be generated by programmatically altering a captured or generated image. For instance, a set of two images may be obtained from two cameras and used to generate a set of ten multiscopic images, each representing a distinct viewpoint of a scene. The set of ten multiscopic images may, but need not necessarily, include the two obtained images.

In some aspects, the full set of multiscopic images of the single frame is used in determining three-dimensional depth. For instance, a full set of ten multiscopic images may be used for triangulation. In alternative aspects, only a subset of multiscopic images of the single frame is selected to be used in determining three-dimensional depth, e.g., based on a predefined set of criteria, such as a level of disparity desired by a content producer or a viewing user. For instance, only two of ten multiscopic images are selected, based on the predefined set of criteria, to be used for triangulation, and the remaining eight multiscopic images may remain unused.

Accordingly, as used herein, a set of multiscopic images of a frame broadly includes any image of a frame capable of forming a stereoscopic pair with another image of the frame. Put another way, the set of multiscopic images of a frame broadly includes any image capable of being combined with at least one other image of the frame to facilitate determining three-dimensional depth. Those skilled in the art will recognize that the number of multiscopic images included and/or selected per frame may be tailored to suit the needs of a particular case.

In one aspect, after receiving the multiscopic frame, the processor analyzes the multiscopic frame to determine one or more facial hairs depicted in the multiscopic images of the multiscopic frame. The processor then generates one or more 2D hair segments representing the one or more facial hairs based on one or more hair maps and a 2D line growing algorithm described herein. Each hair map corresponds to a received image and may be generated using a steerable filter kernel for detecting hair. The processor then generates one or more 3D hair segments based on the generated one or more 2D hair segments and using a predefined stereo matching algorithm described herein and further using a 3D line growing algorithm described herein. The processor then generates a 3D model of facial skin underlying the one or more facial hairs, based on the generated one or more 3D hair segments. In some aspects, the 3D model of the facial skin underlying the one or more facial hairs includes a point cloud representing both visible and hidden areas of the facial skin. In one aspect, the 3D hair segments and the point cloud together form the reconstructed 3D model of the facial hair and skin of a face depicted in the received frame. Accordingly, techniques disclosed herein effectively detect and trace hairs in captured images and reconstruct the hairs in 3D using a multiview stereo approach.

Figure 5:
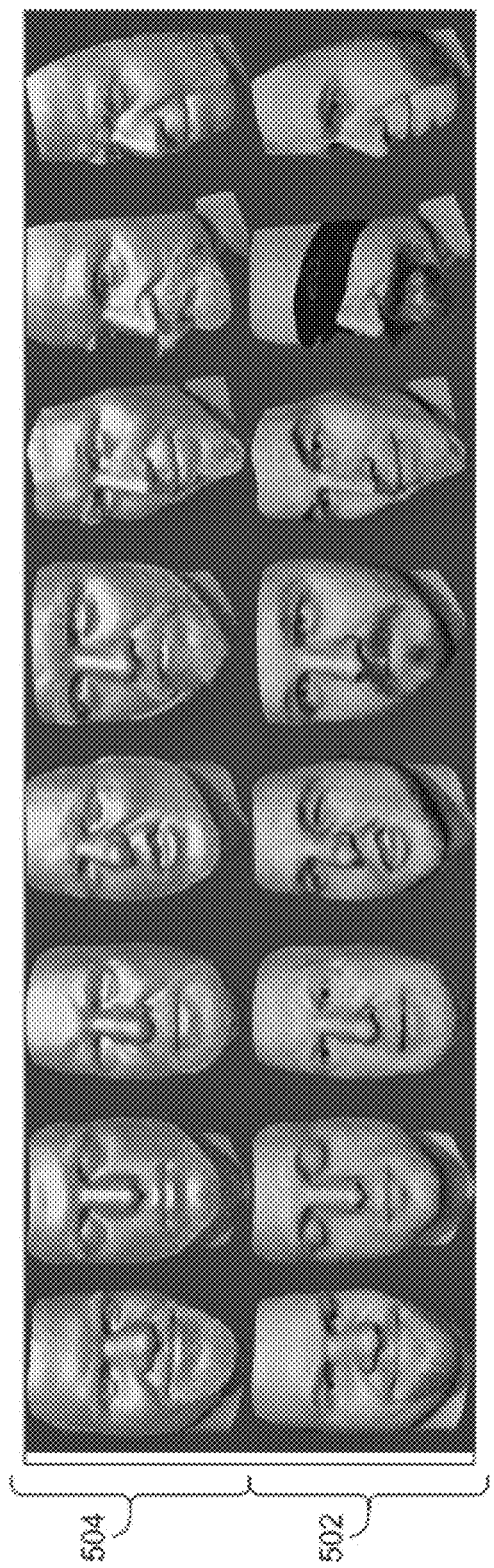
FIG. 5 illustrates source multiscopic images and corresponding geometric 3D models of subjects having a variety of different facial hair styles, according to one aspect disclosed herein.

FIG. 5 illustrates source multiscopic images 502 and corresponding geometric 3D models 504 of subjects having a variety of different facial hair styles, according to one aspect disclosed herein. From left to right, the source multiscopic images 502 portray the facial hair styles of circle beard, 5 o'clock shadow, Van Dyke, chinstrap, Balbo, anchor, handlebar with goatee, and mutton chops, respectively. The 3D models 504 are generated based on the source multiscopic images 502 using the techniques disclosed herein. The 3D models 504 each include a skin surface underlying facial hair, where the skin surface is generated based on the detected hairs and regardless of any extent to which the facial hair occludes the skin surface. In dense regions such as the eyebrow region, where many hairs overlap and obscure one another, the processor may perform hair synthesis to create hair fibers that plausibly match the hairs depicted in the received frame. In sparse regions where individual hairs are discernable in the multiscopic images, the processor may individually reconstruct each detected hair as a piecewise linear collection of line segments. In regions where skin is visible, the processor reconstructs the skin using the techniques disclosed herein. In regions where skin is occluded by facial hair, the processor generates a plausible estimation of the underlying facial hair. By using the techniques disclosed herein, facial skin and hair may be modeled more accurately and/or compellingly in the 3D models 504. More specifically, visible facial skin and/or hair may be modeled more accurately, and occluded facial skin and/or hair may be modeled more compellingly, at least in some cases, relative to alternative approaches. Such 3D models 504 of the face may more faithfully portray the face of a depicted subject at least in some cases.

In one aspect, the processor generates a 3D model that includes a skin episurface and a set of individual hairs. The 3D model is generated in a manner that differentiates between the skin episurface and the set of hairs, processing each of the episurface and the set of hairs in a distinct manner and using one to influence generating the other. As used herein, the skin episurface refers to a skin pseudo-surface that, in areas of no facial hair or low facial hair density, is a close approximation of the true skin surface of the portrayed subject and that, in areas of high density of facial hair, is a postulated 3D surface underneath the layer of visible hair. Although the skin episurface does not always represent the true skin surface, the concept of the skin episurface allows techniques disclosed herein to process, in a unified manner, areas of clear skin and dense beard. That is, the skin episurface may not necessarily be intended to represent the true skin surface, and the processor may generate, from protruding facial hair, an episurface having, to some extent, a protruding facial shape corresponding to the protruding facial hair—even though the face of the portrayed subject may have no such protruding facial shape.

Figure 6:
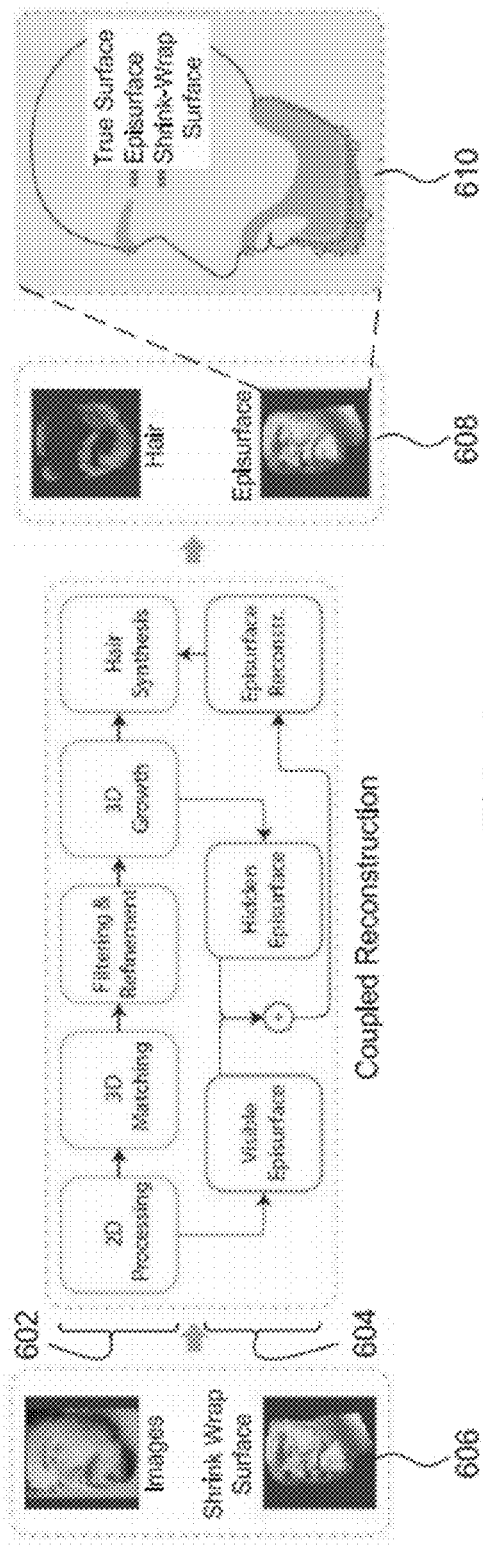
FIG. 6 depicts phases of coupled reconstruction of facial hair and skin, according to one aspect disclosed herein.

FIG. 6 depicts phases of coupled reconstruction of facial hair and skin, according to one aspect disclosed herein. The phases of coupled reconstruction are configured to generate outputs 608 based on inputs 606 that include a set of multiscopic images. In some aspects, the inputs 606 may further include a shrink-wrapped facial surface generated from the set of multiscopic images. For example, the shrink-wrapped facial surface may be generated from the set of multiscopic images based on the techniques for mesoscopic geometry modulation disclosed herein and without using any algorithms specific to hair and skin. The outputs 608 include generated facial hair and a generated episurface. The generated facial hair and episurface may be used to form a 3D model of the face. As shown, the phases include a first set of phases 602 for generating hair and a second set of phases 604 for generating an episurface. The first set of phases 602 for generating hair includes a 2D processing phase, a 3D matching phase, a filtering and refinement phase, a 3D growth phase, and a hair synthesis phase. In the first set of phases 602, a hair map may be computed for each source image, encoding a likelihood of hair being present at each pixel. Further, 3D representations of the hairs may be generated by stereo matching across source images. The second set of phases 604 for generating the episurface includes a visible episurface phase, a hidden episurface phase, and an episurface reconstruction phase. In the second set of phases 604, the episurface is computed and individual hairs are generated in predefined areas of the episurface. At least in some aspects, the predefined areas include areas having hair in a manner such that individual hairs therein cannot be discerned based on the source images.

In one aspect, although the first set of phases 602 and the second set of phases 604 are shown as separate phases, according to aspects disclosed herein, a phase in the first set of phases 602 may be influenced by a phase in the second set of phases 604, and vice versa. There may be input/output dependencies between phases of the same set and across different sets. For example, at least in some aspects, the generated hair is used in generating the episurface, which may then also be used to generate additional hairs. In one aspect, the 3D matching phase and the visible episurface phase depend on the 2D processing phase. The 3D growth phase depends on the filtering and refinement phase, which in turn depends on the 3D matching phase. The hair synthesis phase and the hidden episurface phase depend on the 3D growth phase. The hair synthesis phase also depends on the episurface reconstruction phase, which in turn depends from the visible episurface phase and the hidden episurface phase. Those skilled in the art will recognize that the dependencies between the phases disclosed herein may be tailored to suit the needs of a particular case, without departing from the scope of the present disclosure.

In one aspect, to generate a 3D representation of facial hair, the processor performs an operation that includes generating hair maps based on the source images, stereo matching to compute 3D hairs, and removing outlying 3D hairs and/or refining the 3D hairs. At least in some aspects, the operation may be performed independently for different sides of the face, such as the left and right sides, and the 3D hairs may be merged prior to refining. Additionally or alternatively, the operation may be performed for different desired hair lengths. For instance, a first pass of the operation may be performed to generate long hair, e.g., hair longer than 5 millimeters, and a second pass of the operation may be performed to generate shorter hair.

Figure 7:
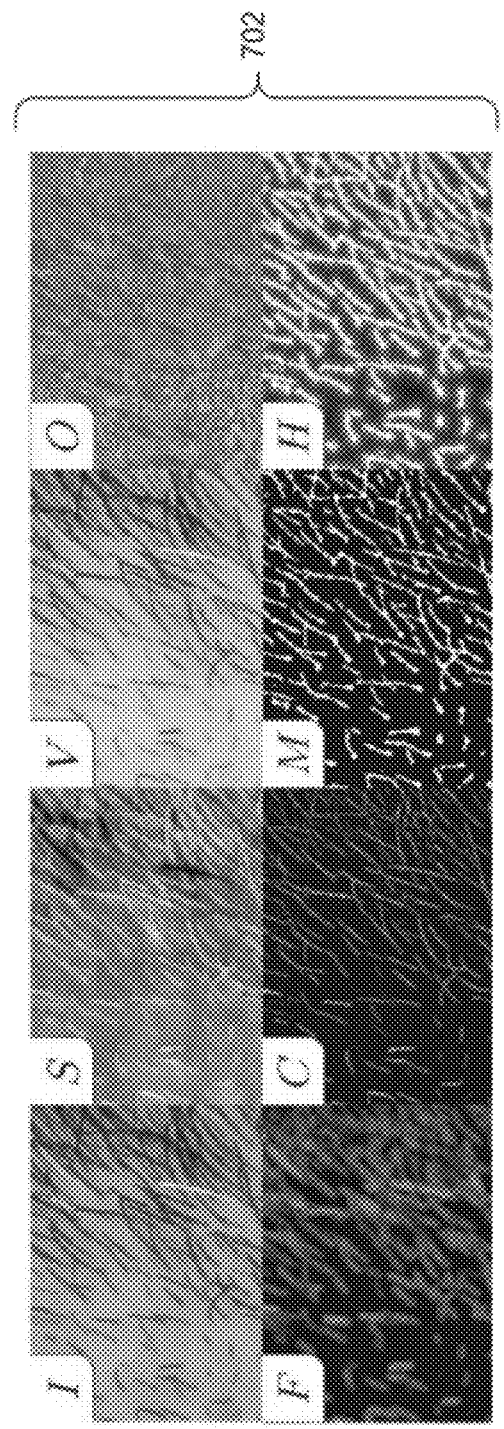
FIG. 7 illustrates example images used during reconstruction, according to one aspect disclosed herein.

FIG. 7 illustrates example images 702 used during reconstruction, according to one aspect disclosed herein. The images 702 include an input image I, a saturation channel S of the input image, a value channel V of the input image, an orientation map O of the input image, a filter response F of the input image, a confidence map C of the input image, a binary mask M for the input image, and a hair map H for the input image. In one aspect, the first set of phases 602 further includes a detection phase, in which the processor detects hair in the images and determines piecewise linear segments in order to generate long sections of hair. To this end, the processor first generates a hair map for each image. At least in some aspects, in the detection phase, one or more properties such as hair color and hair diameter are not necessarily assumed to be uniform. This is because hair color and/or hair diameter are often non-uniform across the face of the subject. Further, the properties may also vary along an individual strand of hair. Further still, hair and skin may often exhibit a larger contrast in saturation and value than in hue.

Accordingly, in one aspect, the processor may convert the images from a first color space, such as the red-green-blue (RGB) color space, to a second color space, such as hue-saturation-value (HSV) color space. The saturation and value channels of the HSV color space may then be used to distinguish individual strands of hair in the converted images. Examples of the saturation and value channels of the HSV color space are shown in the images S and V of the example images 702. Further, oriented filters may be well suited to estimate the local orientation of hair at least in some cases. By applying different filters at multiple scales and scoring based on variance of the filters, the processor may efficiently estimate a dense orientation field for dense hair volumes at least in some cases. In contrast, hair fibers in sparse hair only cover parts of the image. To identify the covered parts of the image, the processor uses an oriented filter kernel $K_\theta$. The oriented filter kernel $K_\theta$ refers to a kernel configured to respond most strongly to a structure oriented in a direction of a predefined orientation $\theta$ when convolved with an image. In one aspect, a Gabor filter may be used, where the Gabor filter has a real component and an imaginary component. In other aspects, other types of filters may be used, such as Second Order Gaussian filters.

In one aspect, the processor uses the real component and not the imaginary component of the Gabor filter to identify the covered parts of the image. The Gabor filter has parameters including a wavelength $\lambda$ and a standard deviation $\sigma$, which may be set according to the desired hair thickness. The saturation and value channels are both convolved with the filter kernel $K_\theta$ for different $\theta$ of a predefined number of orientations N. The values of $\lambda=4$, $\sigma=3$ pixels, and $N=18$, e.g., one orientation per ten degrees, have proven useful at least in some cases. The orientation $\tilde{\theta}$ that produces the highest score at a pixel (x, y) is stored in the orientation map $O(x, y)=\tilde{\theta}$. The highest score may be given by:

$$F(x,y)=|K_{\tilde{\theta}}*V|_{(x,y)}+|K_{\tilde{\theta}}*S|_{(x,y)} \quad \text{(Equation 7)}.$$

An example of the orientation map is shown as image O of the images 702. Further, the filter may create undesired ringing artifacts in some cases, such as shown in image F of the images 702. In one aspect, to correct or reduce the extent of such artifacts, the processor applies non-maximum suppression in order to suppress pixels unless the associated score is the maximum score in direction orthogonal to $\theta$ over the extent of the filter. The processor may then apply a threshold to the resulting confidence map using a predefined technique such as hysteresis. An example of the confidence map is shown as image C of the images 702. In this regard, the upper and lower thresholds of 0.07 and 0.05 have proven useful at least in some cases.

In one aspect, the processor then uses a binary mask M to compute a hair map H according to:

$$H(x, y) = \frac{1}{1 + d(x, y)}. \quad \text{(Equation 8)}$$

In Equation 8, d(x,y) represents the Euclidean distance at (x,y) to the closest foreground pixel in M. Examples of the binary mask and the hair map are shown as images M and H of the images 702, respectively. The hair map H includes a value of 1 for pixels where hair is determined to be present. For improved accuracy, the value decays quickly when moving away from such pixels. By using the hair map in reconstructing facial hair and skin, the reconstructed facial hair and skin may be more realistic and/or compelling at least in some cases, relative to alternative approaches. An example of an alternative approach is one that reconstructs facial hair and/or skin based only on intensity variation and not based on any hair map. The appearance of hair fibers in different viewpoints may vary substantially due to conditions such as specularity, translucency, camera focus, and/or occlusion by other hair fibers. The hair map does not vary as greatly under such conditions and accordingly allows facial hair and skin to be more reliably generated at least in some cases.

Figure 8:
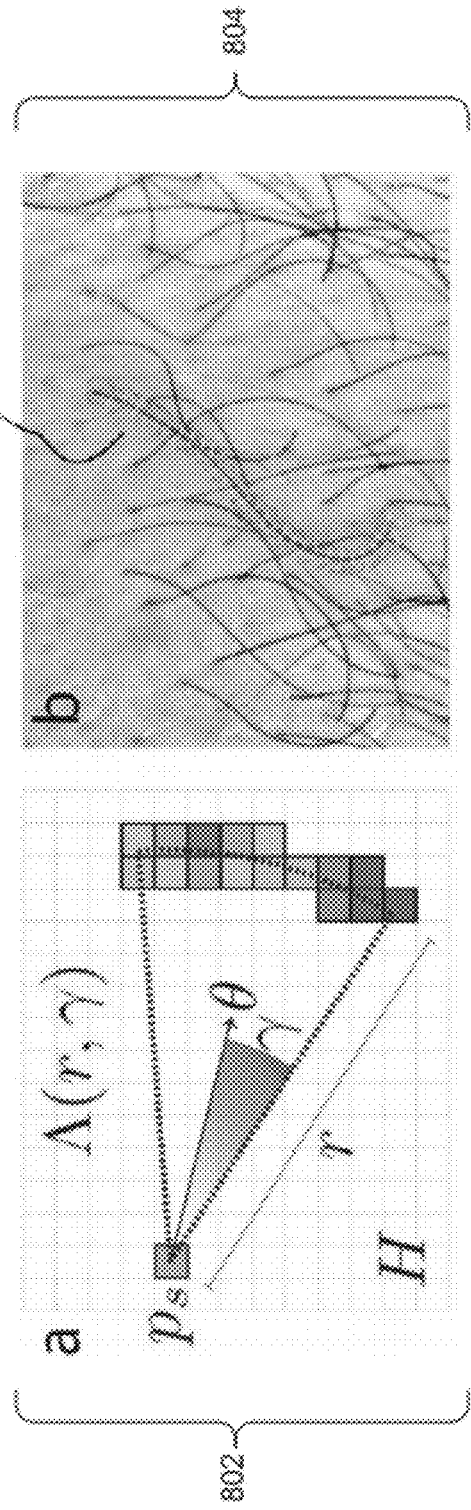
FIG. 8 includes a conceptual depiction of 2D hair tracing using a hair growth algorithm and a corresponding image depicting the traced hair, according to one aspect disclosed herein.

FIG. 8 includes a conceptual depiction 802 of 2D hair tracing using a hair growth algorithm and a corresponding image 804 depicting the traced hair 806, according to one aspect disclosed herein. In one aspect, after generating the hair map, the processor uses a line growing algorithm to identify a one-dimensional neighborhood representing the length, i.e., the entirety, of a strand of hair. The line growing algorithm accepts the hair map as input. Hair growing in 2D produces a chain of associated 2D hair segments. A hair segment $s(p_s, \theta, l)$ is a linear segment of length l starting at $p_s$ in direction of $\theta$. In one aspect, the processor grows the 2D hairs based on the hair map as follows. The processor first selects a seed and a growing direction. To this end, a pixel $p_s=(x_s, y_s)$ in H with H ($p_s$)=1 may be selected as a seed, and the growing direction may be determined from the orientation map O. A growth cone $\Lambda(r,\gamma)$ is defined with growth resolution r and opening angle $2\gamma$. The growth cone defines a set of potential next segments that form an angle of less than $\gamma$ with the axis of the cone which distance to the apex is r. The parameters of r=10 pixels and $\gamma$=60 degrees for the growth cone have proven useful at least in some cases. In other aspects, other parameter values may be used.

In one aspect, when growing a hair segment, the axis of the growth cone is oriented along the direction $\theta$ of the last segment, and the apex of the code is placed at the tip $p_s$. For each potential growth direction in the growth cone, the processor computes a score given by:

$$\xi(d\vartheta) = \left(1 - \frac{|d\vartheta|}{2\gamma}\right)\psi(P(s_{d\vartheta})). \quad \text{(Equation 9)}$$

In Equation 9, $d\theta$ represents the angular direction relative to the axis of the cone and where $P(s_{d\theta})$ denotes the set of pixels covered by the segment $s_{d\theta}$. The function $\psi$ is given by:

$$\psi(P) = \frac{1}{\|P\|}\sum_{p_i \in P}\frac{H(p_i) - v}{1 - v}. \quad \text{(Equation 10)}$$

In Equation 10, the parameter v is defined within [0,1) and controls how tolerant the score is. The higher the value of v, the more restrictive the score is regarding deviation from the detected hair and the fewer types of hairs the score is configured to facilitate detecting in a reliable manner. The pixel $\tilde{p}$ that produces the highest score is kept as the next segment of the hair and the process is repeated until $\xi(\tilde{p})$ falls below a predefined threshold T. The values of v=0.4 and T=0.5 have proven useful at least in some cases. In other aspects, other values may be used in conjunction with the techniques disclosed herein.

As shown in the conceptual depiction 802, a starting point $p_s$ and an initial estimate of the growth direction $\theta$ are provided by a previous hair segment. The apex of the growth cone $\Lambda(r,\gamma)$ with growth resolution r and opening angle $2\gamma$ is placed at $p_s$ and oriented along $\theta$. For all possible target pixels, the processor computes a score, and the pixel with the highest score is added to the hair. The processor repeats these steps of the line growing algorithm until the matching score drops below the predefined threshold.

Figure 9:
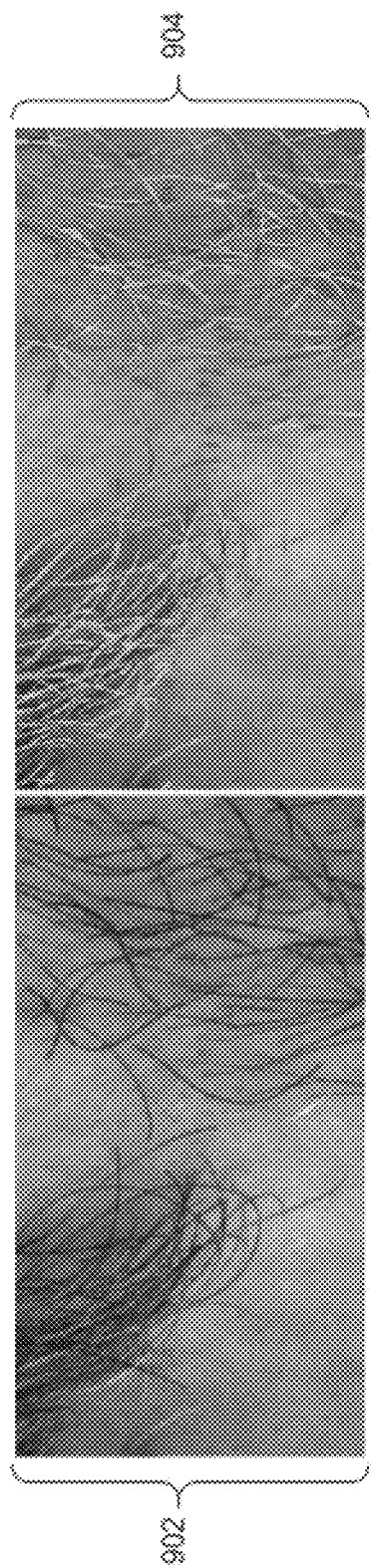
FIG. 9 illustrates an example projection of reconstructed hair into a source view, according to one aspect disclosed herein.

FIG. 9 illustrates an example projection 904 of reconstructed hair into a source view 902, according to one aspect disclosed herein. In one aspect, after determining hair segments in each multiscopic image, the processor performs multi-view stereo matching across multiscopic images, based on the determined hair segments. The view in which the 2D hair is grown is referred to herein as the reference view $\tilde{c}$. The cameras used for matching are denoted as C. A point p in the reference view $\tilde{c}$ describes a ray r(p) in three-dimensional space. Given a search space constrained in depth, computed either from the shrink-wrap surface or given by the calibration, the ray r(p) is constrained to a line segment. The projection of the 3D line segment generates an epipolar line segment in every other view c∈C. From the view containing the longest epipolar line segment, the processor finds the set of potential 3D positions by creating rays through every pixel on the epipolar line segment and intersecting the rays with r(p). These potential 3D positions are converted into potential depths $d_j$ along r(p). The processor then samples the hair segment and computes a matching matrix that contains, for every sample $p_i$ at every depth $d_j$, the highest matching score $\zeta_{ij}$. The processor computes the matching score from the hair map H using the function $\psi$ described above and further using the value-channel of the image. In one aspect, the matching score may be computed by:

$$S_{ij} = \left(\frac{1}{|C|}\sum_{c \in C}\psi(P_{ij}^c)\right)\left(1 - \frac{1}{|C|}\sum_{c \in C}\|V(P_{ij}^c) - V(\tilde{P}_{ij}^c)\|\right). \quad \text{(Equation 11)}$$

In Equation 11, $P_{ij}^c$ is shorthand for the projection of the point $P_{ij}$ into camera c. The point $P_{ij}$ refers to a point on the ray $r(p_i)$ at depth $d_j$. In one aspect, the processor detects the longest contiguous ridge in the matching matrix and keeps the ridge as a 3D hair consisting of a piecewise linear chain of 3D hair segments. A 3D hair segment is defined either via start and end points as $S(P_0, P_1)$ or via length l from $P_0$ in direction was $S(P0, w, _1)$.

In one aspect, after generating 3D piecewise linear hair segments, including connectivity between the hair segments, the processor performs a cleanup operation to remove outlying hair segments and/or refine hair segments. The cleanup operation is configured to eliminate or reduce jaggedness in the generated hair, which may result from the discrete nature of the matching, noise, etc. Depending on the aspect, the cleanup operation includes the respective phases of refining the 3D hair segments, reanalyzing the connectivity of the 3D hair segments, and/or removal of outlying 3D hair segments. To refine the 3D hair segments, the processor performs a minimization involving a predefined data term that seeks consistency between the images and a smoothness term that seeks low curvature of the reconstructed hair segment.

Figure 10:
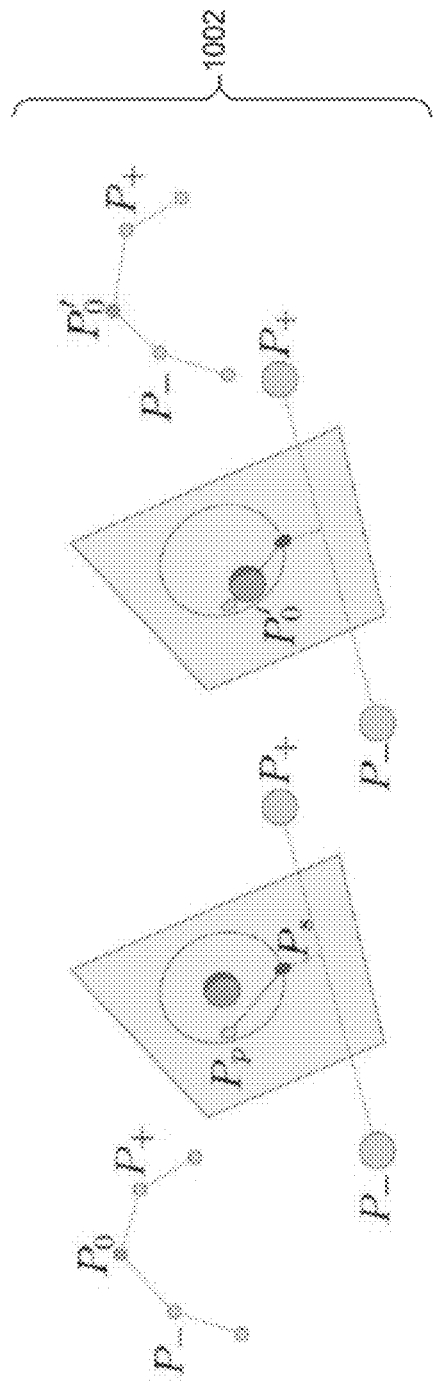
FIG. 10 is a visual depiction of a phase of refining 3D hair segments, according to one aspect disclosed herein.

FIG. 10 is a visual depiction 1002 of the phase of refining 3D hair segments, according to one aspect disclosed herein. As shown, a point P0 on the hair and with neighbors P– and P+ is refined on the plane normal to $P_+ - P_-$. A refined position $P'_0$ is computed as the weighted average of two predefined positions $P_p$ and $P_s$, according to:

$$P'_0 = \frac{wP_p + \lambda P_s}{w + \lambda}. \quad \text{(Equation 12)}$$

In Equation 12, $P_p$ denotes the position that has the highest data fidelity in a local neighborhood defined by the resolution $\tau$, $P_s$ denotes the position that has the highest smoothness given by the projection of $0.5(P_- + P_+)$ into the neighborhood, and $\lambda$ is a regularization parameter. Further, the weight w is computed by:

$$w = \frac{\Xi(S(P_-, P_p)) + \Xi(S(P_p, P_+))}{\Xi(S(P_-, P_s)) + \Xi(S(P_s, P_+))} - 1. \quad \text{(Equation 13)}$$

The refinement is then run for a predefined number N of iterations. The values of $\tau = 0.1$ mm, $\lambda = 0.01$, and N=20 have proven useful at least in some cases. In other aspects, other values may be used for refining the 3D hair segments.

In one aspect, the processor disconnects two hair segments having low-confidence connectivity. Because the hairs are projected onto the image plane, 2D hair tracing may inadvertently trace multiple hairs as a single hair. In some aspects, if the hairs differ in depth, the stereo matching would only match and reconstruct one of the hairs. If the hairs do not differ in depth but only in direction, then there would be a point of direction change where one hair touches the other hair. Accordingly, in one aspect, the processor removes the connectivity of two connected hair segments if the difference in orientation is above a predefined threshold.

Figure 11:
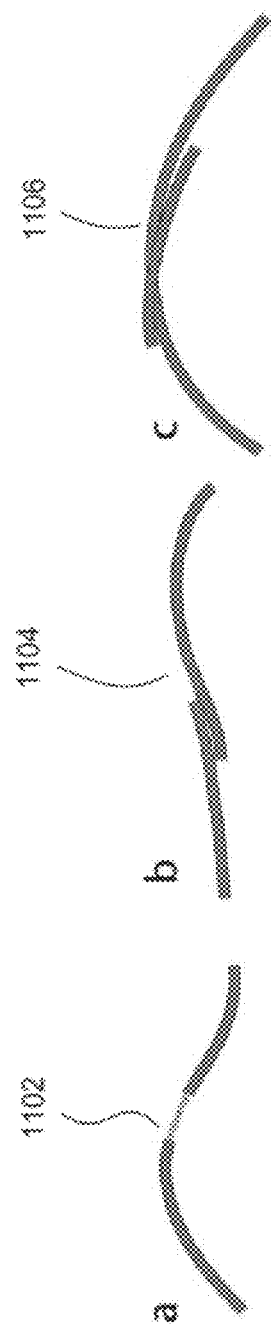
FIG. 11 depicts example scenarios in which unconnected hair segments are identified and connected, according to one aspect disclosed herein.

FIG. 11 depicts example scenarios in which the processor identifies and connects hair segments that are unconnected, according to one aspect disclosed herein. In one aspect, the processor identifies unconnected hair segments satisfying predefined criteria and connects the identified hair segments. The predefined criteria may be satisfied if all of the following are true: the segments have unconnected endpoints with the segments on the opposite sides of the endpoints, the unconnected endpoints are sufficiently close in space, and the segments have sufficiently consistent direction. Additionally or alternatively, the predefined criteria may also be satisfied if all of the following are true: the segments have unconnected endpoints with the segments on opposite sides of the endpoints, the segments overlap, and the segments have sufficiently consistent direction. Further, shorter hairs that are completely enclosed by longer hairs may be merged into the longer hairs. At least in some aspects, hairs are linked when their tips are closer than 1 mm and enclose an angle of less than twenty degrees. Further, at least in some aspects, hair segments are merged when the hair segments are closer than 0.1 mm and enclose an angle of less than twenty degrees. The distance between unconnected endpoints and/or the direction between the segments may be tailored to suit the needs of a particular case. As shown, the example scenarios include a first scenario 1102 in which the processor links hairs having spatially close tips and enclosing a small angle. The example scenarios further include a second scenario 1104 in which the processor merges hairs having overlapping parts. The example scenarios further include a third scenario 1106 in which the processor removes a hair that is completely enclosed within another, larger hair.

In one aspect, after updating the connectivity between hair segments, the processor may repeat the phase of refining 3D hair segments, by performing the phase on the updated set of hair segments. The processor may then remove outlying 3D hair segments. Depending on the aspect, the outlying 3D hair segments may be removed by creating a grid for the 3D workspace, counting the number of hairs in each voxel, and/or deleting hairs that are distant from the surface and/or distant from other hairs (e.g., in voxels with a low hair count).

Figure 12:
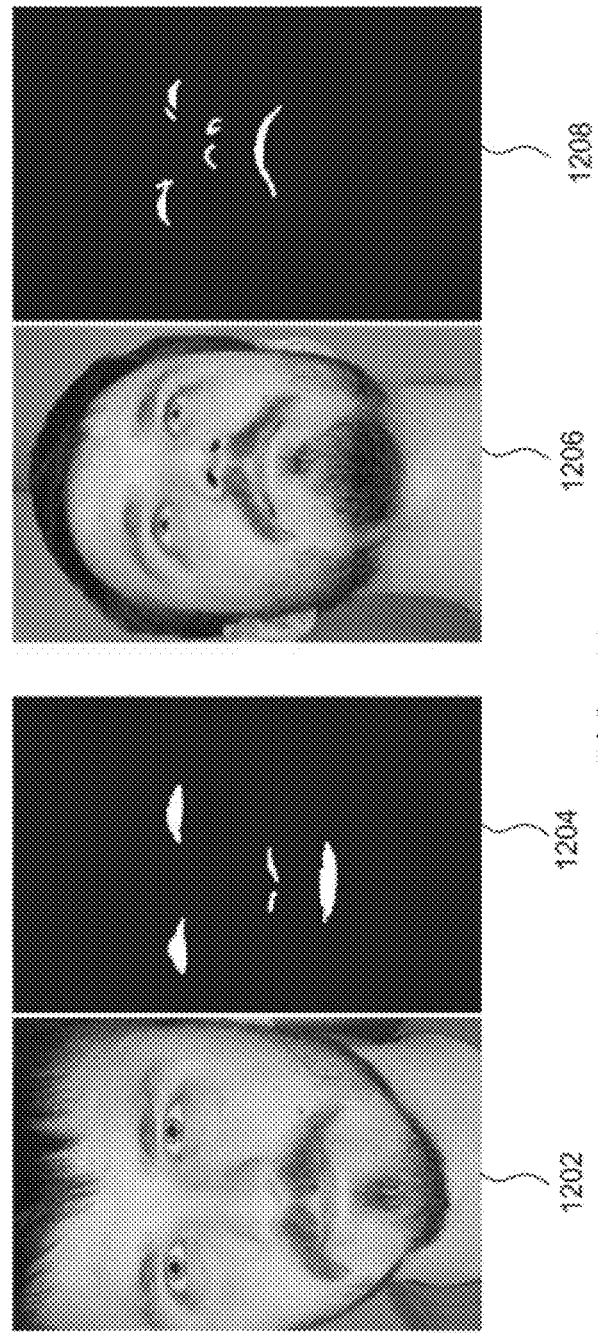
FIG. 12 depicts masks identifying facial regions where no hairs should be detected, according to one aspect disclosed herein FIG. 13 includes example images depicting how inpainting of sparse hair prevents stereo reconstruction from creating artifacts in the sparse hair, according to one aspect disclosed herein.

FIG. 12 depicts masks identifying facial regions where no hairs should be detected, according to one aspect disclosed herein. In one aspect, the processor may also identify areas such as eyes or lips where no hairs should be detected. To this end, the processor may generate binary masks based on user input and/or feature detection. The binary masks may be referred to herein as fix maps. At least in some aspects, fix maps from multiple viewpoints are used. The respective viewpoints from a perspective of a center camera and from a perspective of a camera from below have proven useful at least in some cases. The processor may remove any hairs that are projected primarily into the masked areas. Doing so prevents the 3D facial model from erroneously including hair in facial regions such as the iris or the lips, which may have an image structure locally similar to hair. As shown, the masks include a first binary mask 1204 representing a viewpoint from a center camera and having an associated source image 1202. The masks further include a second binary mask 1208 representing a viewpoint from a camera from below and having an associated source image 1206.

In one aspect, after refining 3D hair segments, the processor may perform 3D hair tracing based on a hair growth algorithm. To this end, the processor may use a three-dimensional growing cone $\Lambda(r,\gamma)$ to determine potential 3D hair segments. Values for the growth resolution r and the opening angle $2\gamma$ may be tailored to suit the needs of a particular case. The values of r=1 mm and $\gamma=30°$ have proven useful at least in some cases. In one aspect, the apex $P_s$ of the cone is placed at the tip of the last segment, and the axis is aligned with its direction w=(θ, φ). For each potential segment $S_w=S(P_s, w, r)$ of the growth cone with direction w=(dθ, dφ), the processor computes a score using all cameras C where the segment is expected to be visible:

$$\Xi(S_w) = \frac{\sum_{c \in C} p_w^c \psi(P(S_w^c))}{\sum_{c \in C} p_w^c}. \quad \text{(Equation 14)}$$

In Equation 14, $S_w^c$ is shorthand for the projection of the segment $S_W$ into camera c, P denotes the pixels spanned by the projection, and $p_w^c$ denotes the angle that the direction w encloses with the optical axis of the camera c. In some embodiments, hair growth terminates when the score drops below a predefined threshold τ. And although the values of $0.1 \leq \tau \leq 0.3$ have proven useful at least in some cases, in other aspects, other values of τ may be used without departing from the scope of the present disclosure.

In one aspect, after performing 3D hair tracing, the processor generates the visible skin episurface and estimates the hidden skin episurface. To generate the visible skin episurface, the processor performs pair-wise stereo reconstruction to produce a 3D point cloud. The difference between generating the visible skin episurface and the shrink-wrap surface is that in the former case, the processor is equipped with information regarding where hair is expected. Using the information, the processor first masks areas containing denser hair, in effect excluding such masked areas from reconstruction. The processor applies an opening operation followed by a closing operation on the mask to only exclude areas having considerable amounts of hair. At least in some aspects, individual hairs would not be affected, because the individual hairs are removed by a subsequent inpainting operation. The processor then performs the subsequent inpainting operation by applying a Gaussian filter to the image data with a spatially varying, anisotropic kernel. The orientation of the filter is given by the orientation map O and the spatial extent σ is determined based on the hair map H. At least in some aspects, in areas where H is low, the spatial extent would also be low, e.g., σ<1 pixel, and no filtering occurs as a result in such scenarios. On the other hand, in areas where H is high, the image is blurred, in effect inpainting individual hairs. Such inpainting reduces the strong image gradients produced by individual hairs and prevents matching.

Figure 13:
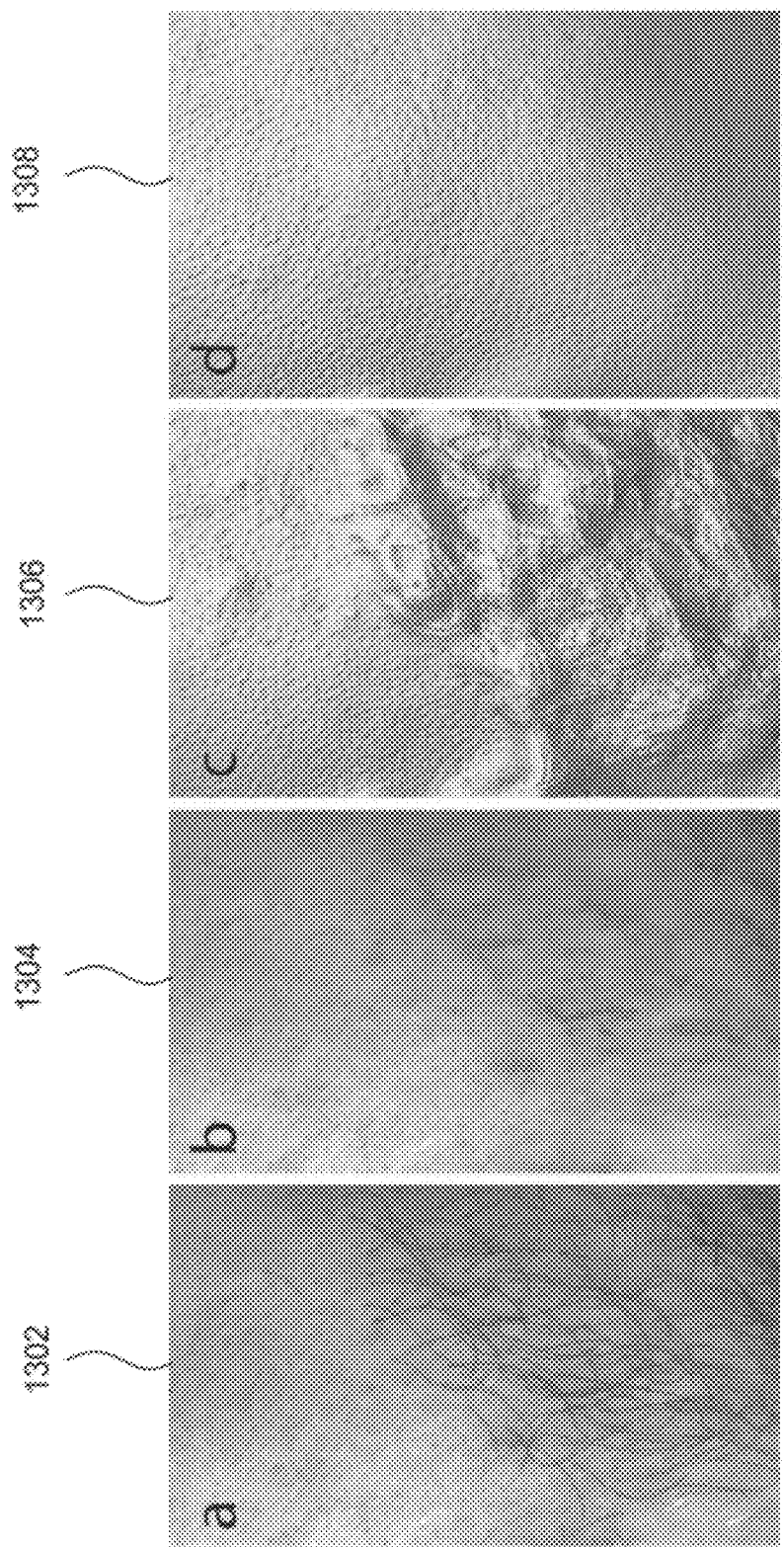

FIG. 13 includes example images depicting how inpainting of sparse hair prevents stereo reconstruction from creating artifacts in the sparse hair, according to one aspect disclosed herein. In one aspect, the processor performs the inpainting instead of masking out individual hairs, because image pyramids are used in performing the stereo reconstruction in order to generate the visible skin episurface. Although the images are sub-sampled linearly, the masks are sub-sampled using a nearest-neighbor technique, which may result in a discrepancy between mask and image at higher layers of the image pyramids at least in some cases. Accordingly, the inpainting is performed to eliminate or mitigate such discrepancies. As shown, the example images include a received source image 1302 and a corresponding inpainted image 1304. The example images further include a reconstructed image 1306 based on the received source image 1302 and a reconstructed image 1308 based on the inpainted image 1304. Although the visible areas of the skin are identical or similar between the reconstructed images 1306, 1308, the former reconstructed image 1306 exhibits shrink-wrap artifacts in areas of the skin containing hair, while the latter reconstructed image 1308 exhibits no such artifacts.

In one aspect, after generating the visible skin episurface, the processor estimates the hidden skin episurface. To this end, the processor designates the root of each 3D hair to be the end that is closest to the surface of the shrink-wrap model of the depicted subject. In the case of short whiskers, both ends of the whiskers may be close to the surface. Accordingly, the root of such short whiskers may be arbitrarily chosen, with little to no effect on subsequent operations. Further, at least in some aspects, hairs distant from the surface may be disregarded at least during root designation. For each hair root, the processor finds neighboring roots within a predefined search radius. The processor performs a least-squares fit of a plane to the root and its neighbors, in order to estimate the surface normal at the root. The processor then collects, for all roots, the 3D coordinates and the estimated surface normals. Thus, the processor generates a point cloud that provides a sampling of the underlying hidden episurface.

Figure 14:
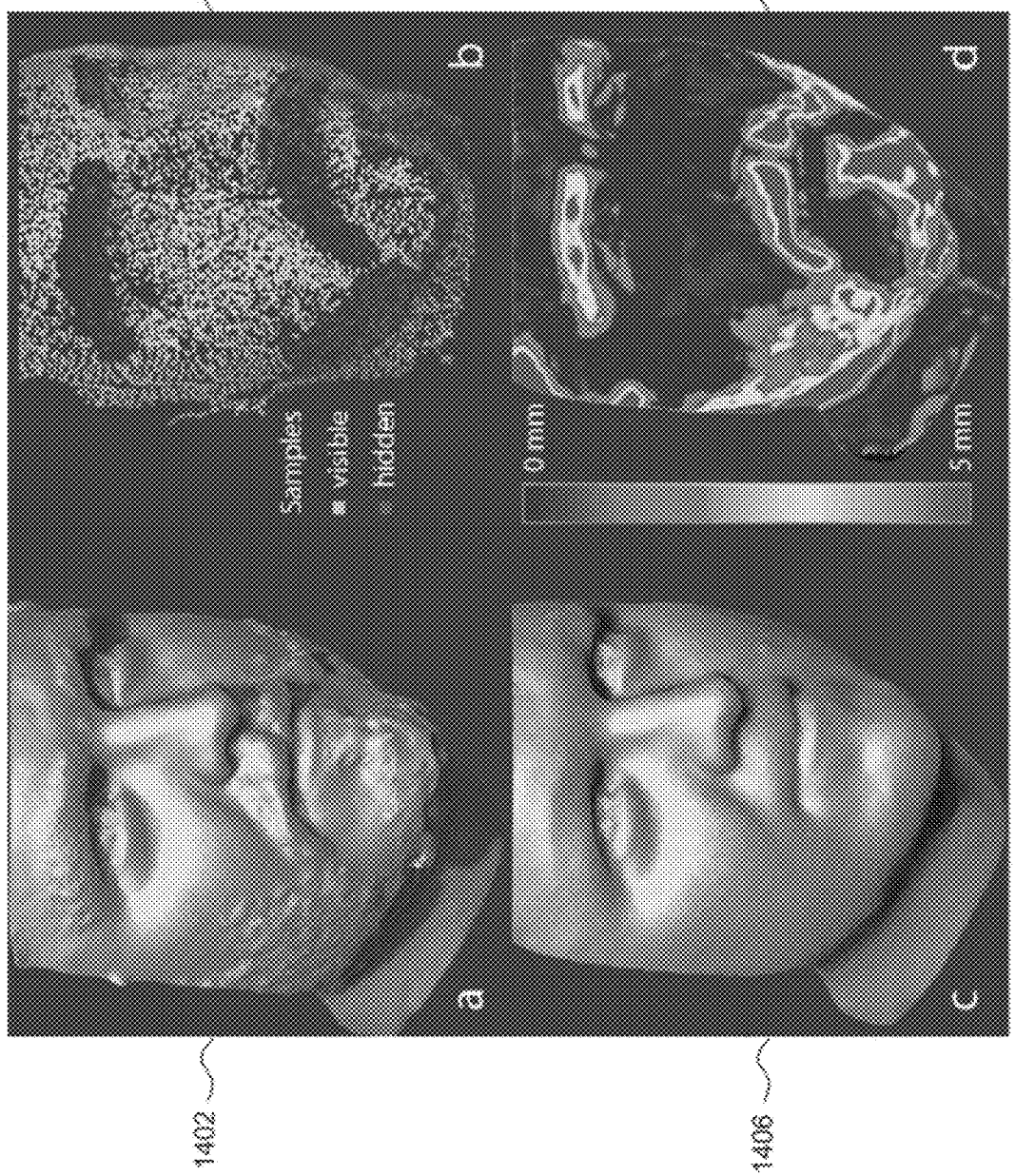
FIG. 14 includes example images depicting construction of the skin episurface, according to one aspect disclosed herein.

FIG. 14 includes example images depicting construction of the skin episurface, according to one aspect disclosed herein. In one aspect, the processor produces two sets of points for the visible and hidden skin episurfaces, respectively, by computing the visible skin episurface and estimating the hidden skin episurface. In one aspect, the sets of points are combined and serve as input to a Poisson reconstruction followed by a refinement operation. The refinement operation incorporates the hair map as a regularization prior, preferring smoother solutions in areas where hair is expected to be present. As shown, the example images include a first image 1402 depicting a shrink-wrap surface corresponding to a received source image. The example images further include a second image 1404 depicting: (i) a point cloud of the visible episurface in a first shade and (ii) points from the hidden episurface in a second shade. The example images further include a third image 1406 depicting the final, reconstructed episurface. The example images further include a fourth image 1408 depicting differences between the shrink-wrap surface and the reconstructed episurface. In this particular example, the shrink-wrap surface and the reconstructed episurface are nearly identical in areas of clear skin, but the reconstructed episurface provides a smoother estimation in areas having hair coverage.

In one aspect, after constructing the skin episurface, the processor performs a hair synthesis operation to achieve greater density of 3D hair in areas where image data indicates the presence of hair, but where individual hairs are indistinguishable from one another and thus could not be reconstructed. At least in some aspects, hair synthesis is performed by finding seeds on the episurface and using the seeds as starting points for growing hair. To find seeds on the episurface, the processor first projects the reconstructed 3D hairs into the cameras to prevent finding seeds in areas where hair has already been reconstructed. Next, the processor projects every vertex of the episurface into the images. The processor computes values $\overline{H}^c$ for all cameras c by averaging the hair map H within a predefined window. The processor chooses a vertex as hair seed if:

$$\overline{H}^{\tilde{c}} > \alpha \text{ and } \frac{1}{|C|}\sum_{c \in C} \overline{H}^c > \beta. \quad \text{(Equation 15)}$$

In Equation 15, $\tilde{c}$ represents the camera that has the least foreshortening with the vertex. Further, the parameters values of α=0.3 and β=0.2 have proven useful at least in some cases. Other parameter values may be used in alternative aspects. At least in some aspects, if a vertex is selected as a seed, the vertex would prevent other vertices in the neighborhood of the vertex from also becoming seeds.

Figure 15:
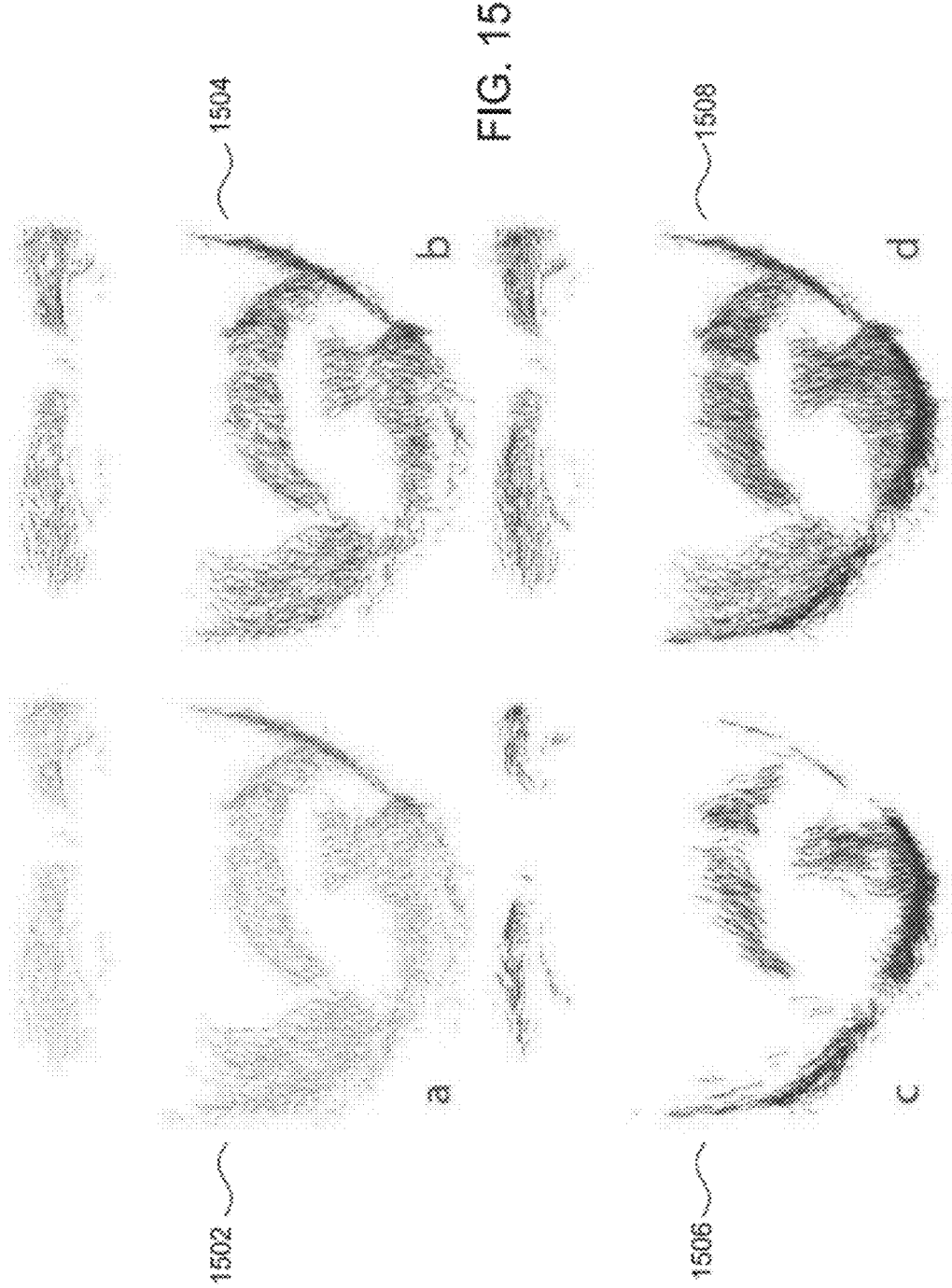
FIG. 15 includes example images showing different phases of hair reconstruction, according to one aspect disclosed herein.

FIG. 15 includes example images showing different phases of hair reconstruction, according to one aspect disclosed herein. In one aspect, after finding seeds, the processor grows hairs using the seeds as a starting point for growth. In one aspect, the default growth direction is normal to—i.e., perpendicular to—the surface, and the maximum growth length is the average length of all reconstructed sample hairs. These default properties may be blended with properties sampled from neighboring hairs that are successfully reconstructed. The properties of the sample hairs and the default growth properties may be interpolated using Gaussian radial basis functions (RBFs). Doing so provides a smooth interpolation of growth properties that is faithful to the sample hairs that could not be reconstructed and that is plausible in areas of dense hair.

In one aspect, after interpolating the properties, the processor performs 3D hair tracing using the interpolated properties and based on a hair growth algorithm previously described herein. At least in some aspects, in performing 3D hair tracing using the interpolated properties, the processor further takes into account the orientation maps to give a sense of directionality for the growth. The growth properties may be updated as a hair grows, to ensure that the hair remains faithful to the style of the reconstructed fibers within the neighborhood of the hair. As shown, the example images include a first image 1502 depicting reconstructed 3D hair subsequent to the matching phase. The example images further include a second image 1504 depicting the 3D hair subsequent to the 3D growth phase. The example images further include a third image 1506 depicting the synthesized hair subsequent to the hair synthesis operation. The third image 1506 shows the effect of hair synthesis based on reconstructed sample hairs. Hair whiskers in the eyelashes are shorter and point directly away from the surface, while hair fibers in the mustache are longer and follow the overall direction in the facial area of the mustache. The example images further include a fourth image 1508 depicting a final composition of: (i) the 3D hair subsequent to the 3D growth phase and (ii) the synthesized hair subsequent to the hair synthesis operation.

Figure 16:
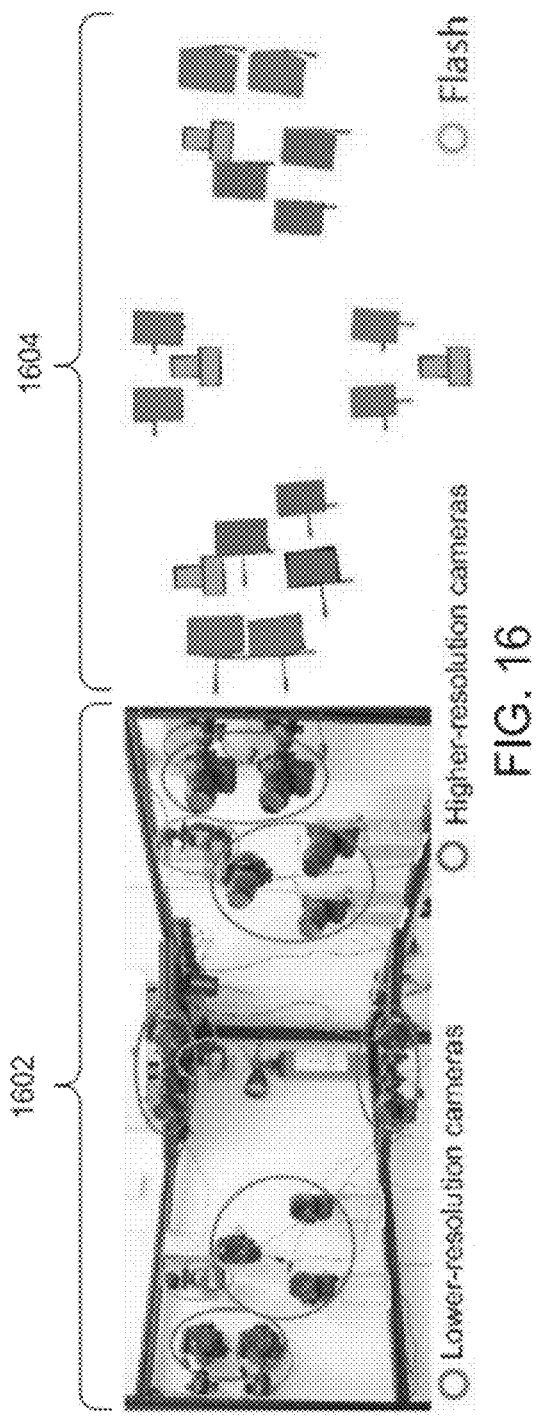
FIG. 16 illustrates an example camera configuration for capturing source multiscopic images and a corresponding schematic, according to one aspect disclosed herein.

FIG. 16 illustrates an example camera configuration 1602 for capturing the source multiscopic images and a corresponding schematic 1604, according to one aspect disclosed herein. The configuration 1602 includes eight cameras configured to capture the face of a subject at a first resolution. The configuration 1602 further includes six cameras configured to capture the chin area of the subject at a second resolution. The second resolution is higher than the first resolution at least in some aspects. In one aspect, the six cameras are equipped with 85 mm lenses and are arranged in pairs of two around the subject, including a pair on each side, a pair straight ahead and a pair from below. The eight cameras are each equipped with 100 mm macro lenses and are arranged in tuples of three on each side of the subject. At least in some aspects, the skin reconstruction takes into account only image data captured by the eight cameras, while the hair reconstruction takes into account image data captured from all cameras—i.e., the six cameras in addition to the eight cameras. The subject is illuminated with multiple flashes, and cross polarization is used to remove specularities. A total of four flashes for illumination has proven useful at least in some cases. Because only a single frame per camera is sufficient in order to apply the techniques disclosed herein, the configuration 1602 may acquire the image data in mere fractions of a second at least in some cases.

Figure 17:
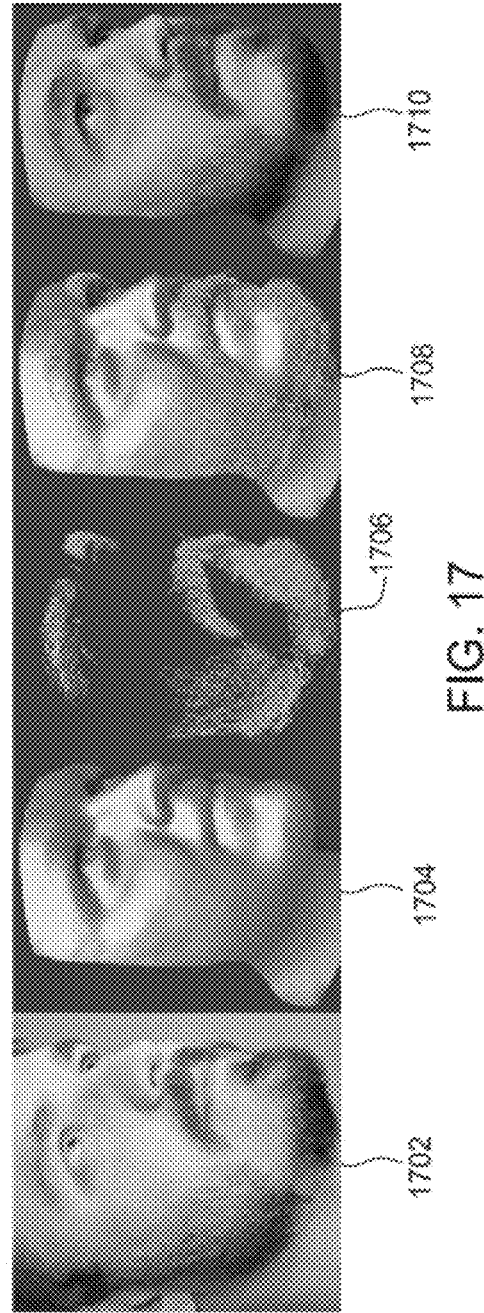
FIG. 17 includes example images depicting different phases of reconstruction for a subject, according to one aspect disclosed herein.

FIG. 17 includes example images depicting different phases of reconstruction for a subject, according to one aspect disclosed herein. The example images include a first image 1702 depicting a source multiscopic image portraying a subject. The example images further include a second image 1704 depicting a corresponding, reconstructed skin episurface and a third image 1706 depicting reconstructed hair. The example images further include a fourth image 1708 depicting a reconstructed model that includes a composition of the reconstructed skin episurface and the reconstructed hair. The example images further include a fifth image 1710 depicting the reconstructed model with mapped texture.

Figure 18:
FIG. 18 includes example images depicting different phases of reconstruction for subjects having a variety of different facial hair styles, according to one aspect disclosed herein.

FIG. 18 includes example images depicting different phases of reconstruction for subjects having a variety of different facial hair styles, according to one aspect disclosed herein. As shown, the subjects include a first subject 1802 having a facial hair style of circle beard and a second subject 1804 having a facial hair style of mutton chops. The subjects further include a third subject 1806 having a facial hair style of anchor and a fourth subject 1808 having a facial hair style of 5 o'clock shadow. The subjects further include a fifth subject 1810 having a facial hair style of handlebar & goatee and a sixth subject 1812 having a facial hair style of Balbo. The subjects further include a seventh subject 1814 having a facial hair style of chinstrap and an eighth subject 1816 having a facial hair style of Van Dyke. As shown, the example images include, for each subject and from left to right: (i) a source multiscopic image portraying the subject; (ii) a corresponding, reconstructed model for the subject, without texture mapping; and (iii) the reconstructed model for the subject, with texture mapping applied.

Figure 19:
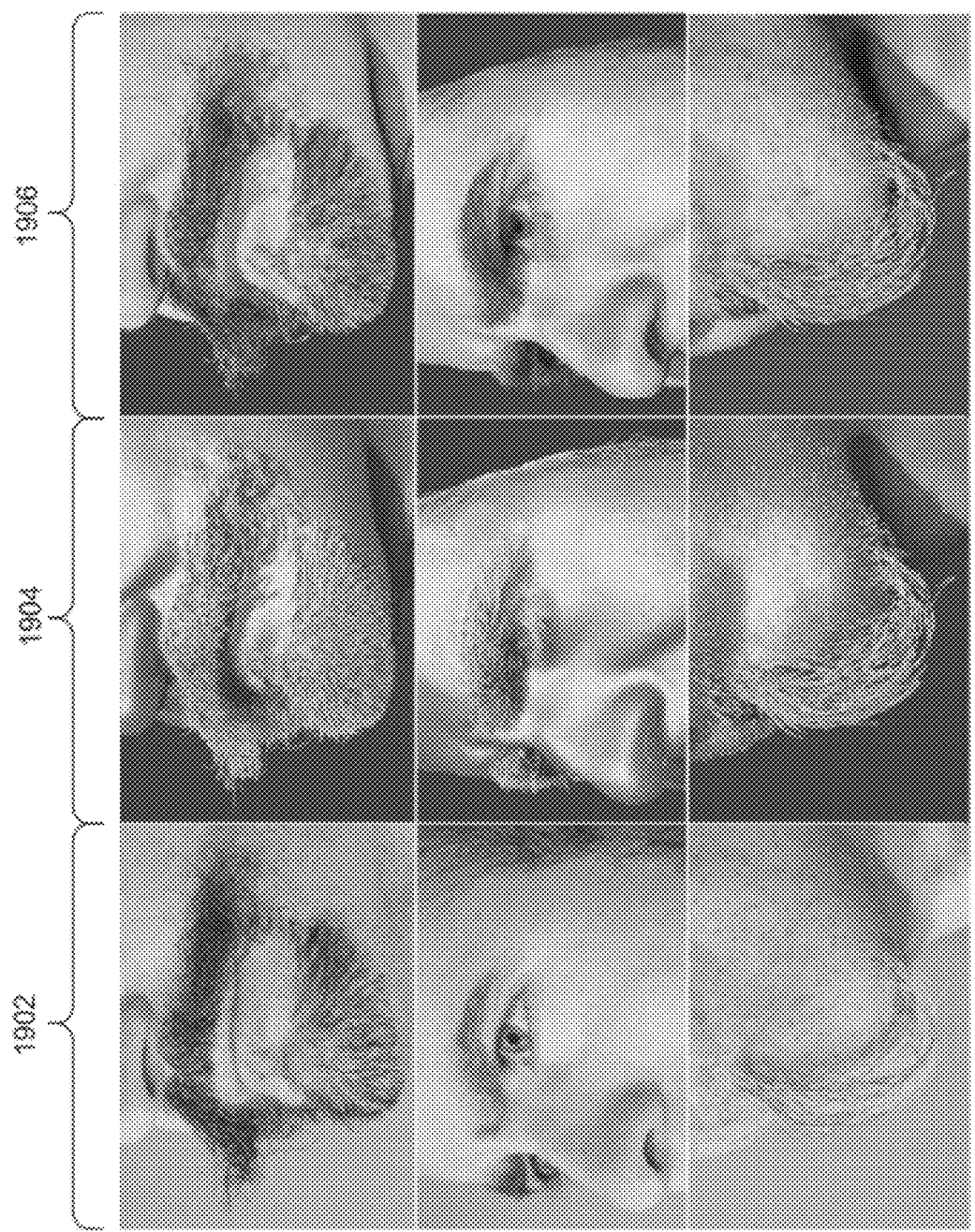
FIG. 19 includes example images depicting close-ups of specific facial areas of the reconstructed model and of the source images, respectively, according to one aspect disclosed herein.

FIG. 19 includes example images depicting close-ups of specific facial areas of the reconstructed model and of the source images, respectively, according to one aspect disclosed herein. As shown, the example images include a set of source images 1902 portraying specific facial areas of one or more subjects. The example images further include a set of images 1904 portraying a reconstructed model for the one or more subjects, without texture mapping. The example images further include a set of images 1906 portraying the reconstructed model for the one or more subjects, with texture mapping applied. Each set of images 1902, 1904, 1906 include, from top to bottom, images depicting close-ups of, respectively: (i) a chin area having a handlebar & goatee facial hair style; (ii) an eyebrow area; and (iii) a chin area having an anchor facial hair style. As shown, the model includes reconstructed hairs in facial areas where individual hairs are visible in the source images. Further, the reconstructed model includes synthesized hairs that provide a plausible volume of hair fibers in facial areas having dense hair coverage in the source images. Further, the facial skin is accurately reconstructed in areas with little to no hair coverage, and a plausible substrate is provided as a pseudo-surface in areas having dense hair coverage.

Figure 20:
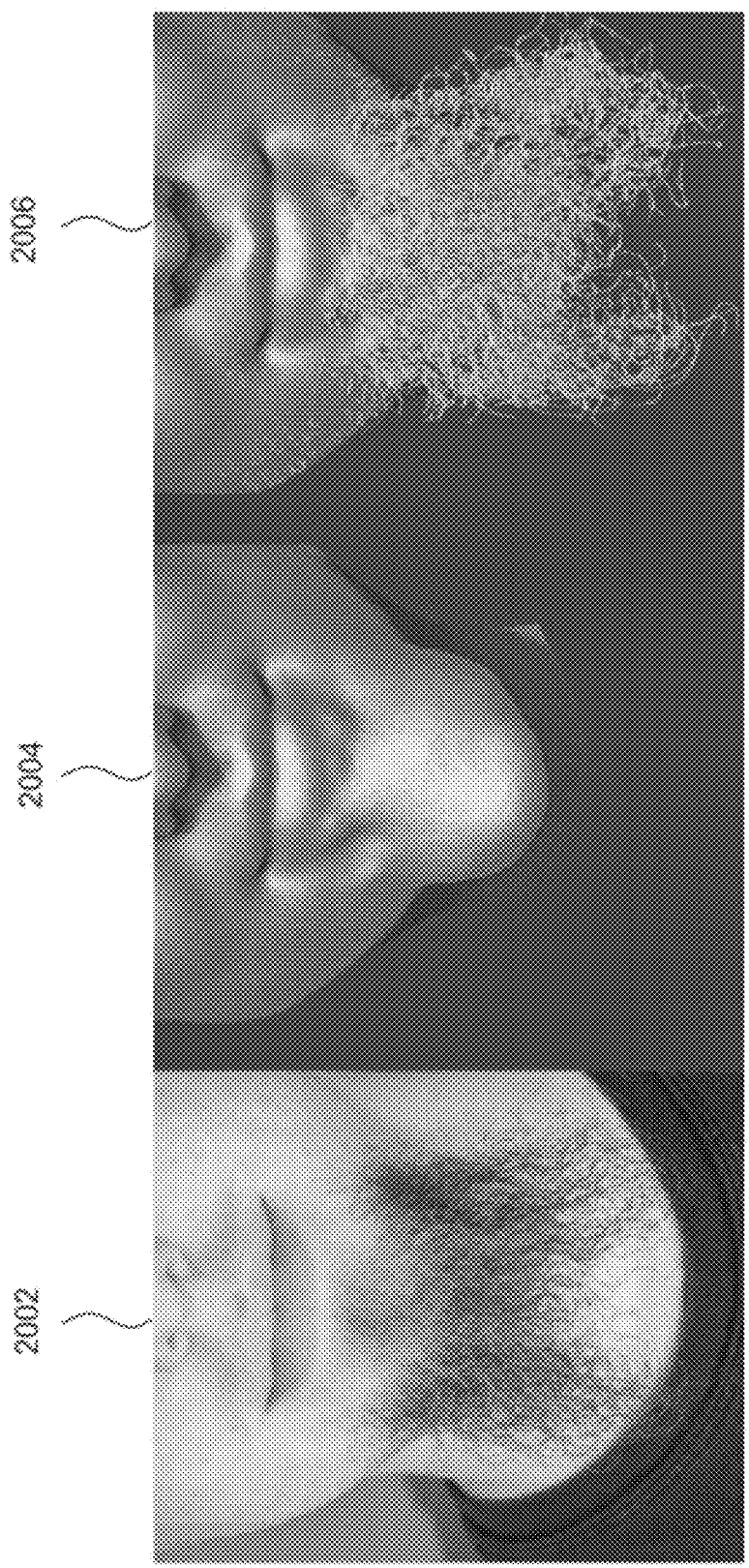
FIG. 20 includes example images depicting a reconstructed episurface for a subject having protruding facial hair, according to one aspect disclosed herein.

FIG. 20 includes example images depicting a reconstructed episurface for a subject having protruding facial hair, according to one aspect disclosed herein. As shown, the example images include a first, source image 2002 depicting a bearded subject, a second image 2004 depicting a corresponding, reconstructed episurface, and a third image 2006 depicting the corresponding, final composition of the reconstructed subject. As shown, the reconstructed episurface is a pseudo-surface underneath the outermost layer of hair and is not intended to approximate the shape of the underlying skin in the case of protruding facial hair. In this particular example, the shape of the episurface approximates the beard rather than the actual underlying skin, because the episurface is not formulated with a goal of approximating the actual underlying face shape. In alternative aspects, however, the techniques disclosed herein may be adapted to generate episurfaces having face shapes that are more anatomically plausible.

Figure 21:
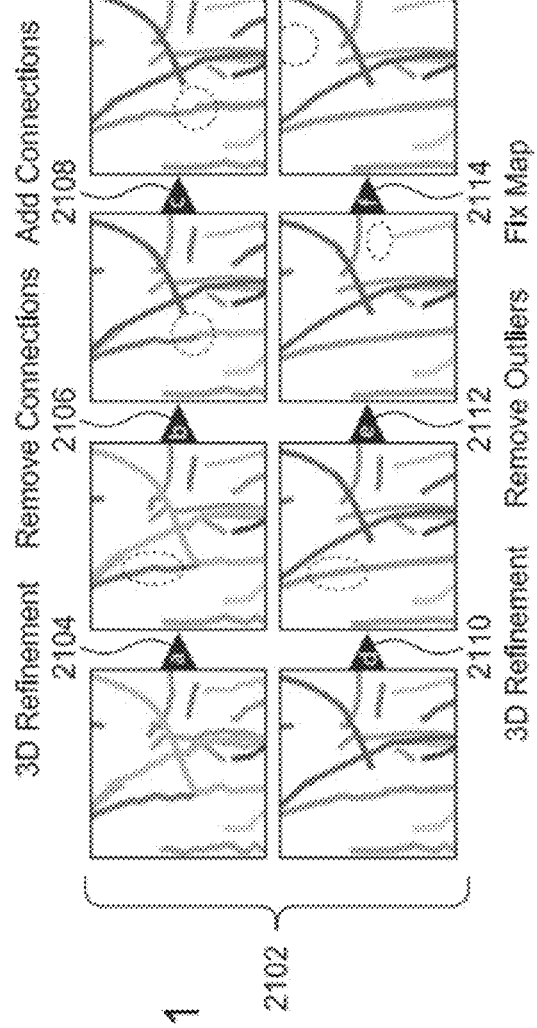
FIG. 21 is a visual depiction of hair segments during filtering and refinement, according to one aspect disclosed herein.

FIG. 21 is a visual depiction 2102 of 3D hair segments in the filtering and refinement phase, according to one aspect disclosed herein. As shown, the operations 2102 include a first 3D refinement operation 2104, a connectivity removal operation 2106, and a connectivity establishment operation 2108. The operations 2102 further include a second 3D refinement operation 2110, an outlier removal operation 2112, and a fix map operation 2114. The visual depiction 2102 includes 3D hair segments with respect to each of the above operations. The 3D refinement operations 2104, 2110 are described above at least in conjunction with FIG. 10. The connectivity removal and establishment operations 2106, 2108 are described above at least in conjunction with FIG. 11. The outlier removal and fix map operations are described above at least in conjunction with FIG. 12.

Figure 22:
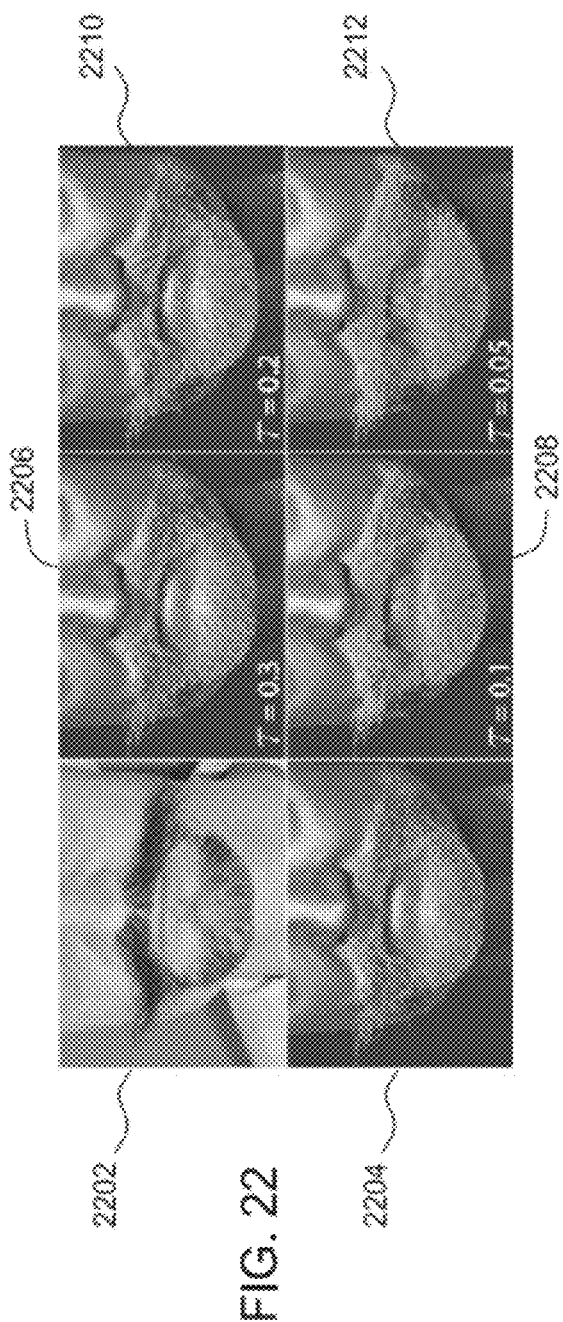
FIG. 22 illustrates an impact of varying a threshold for terminating hair growth, according to one aspect disclosed herein.

FIG. 22 includes a set of images illustrating the impact of varying the threshold T for terminating hair growth, according to one aspect disclosed herein. As described above at least in conjunction with Equation 14, after refining 3D hair segments, the processor may perform 3D hair tracing based on a hair growth algorithm, including the threshold $\tau$ for terminating hair growth. The set of images includes an input image 2202 and an intermediate image 2204 showing reconstructed hair fibers. The set of images also includes a first output image 2206 for $\tau=0.3$, a second output image 2208 for $\tau=0.1$, a third output image 2210 for $\tau=0.2$, and a fourth output image 2212 for $\tau=0.05$. As shown in the set of images, a smaller value for $\tau$ corresponds to a relaxed termination cutoff for hair growth, which yields longer hair segments from the hair growth algorithm.

Figure 23:
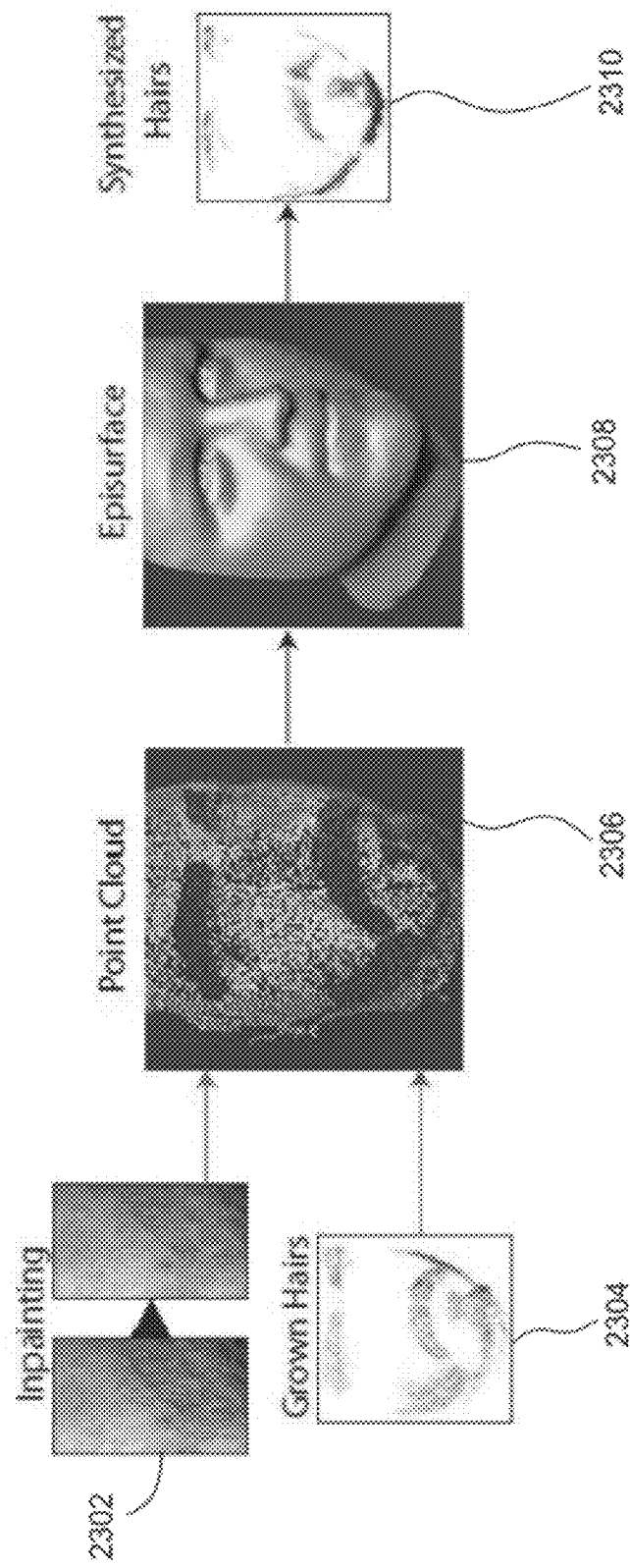
FIG. 23 is a visual depiction of episurface reconstruction operations, according to one aspect disclosed herein.

FIG. 23 is a visual depiction of operations in the episurface reconstruction phase, according to one aspect disclosed herein. As shown, the operations include generating a point cloud 2306 that combines two sets of points from inpainted images 2302 and grown hairs 2304, respectively. The operations also include generating an episurface 2308 from the point cloud 2306. The operations further include synthesizing additional hairs 2310 from the episurface 2308. Generating the point cloud 2306 is described above at least in conjunction with Equation 14 and FIG. 13. Generating the episurface 2308 is described above at least in conjunction with FIG. 14. Synthesizing additional hairs is described above at least in conjunction with FIG. 15.

Figure 24:
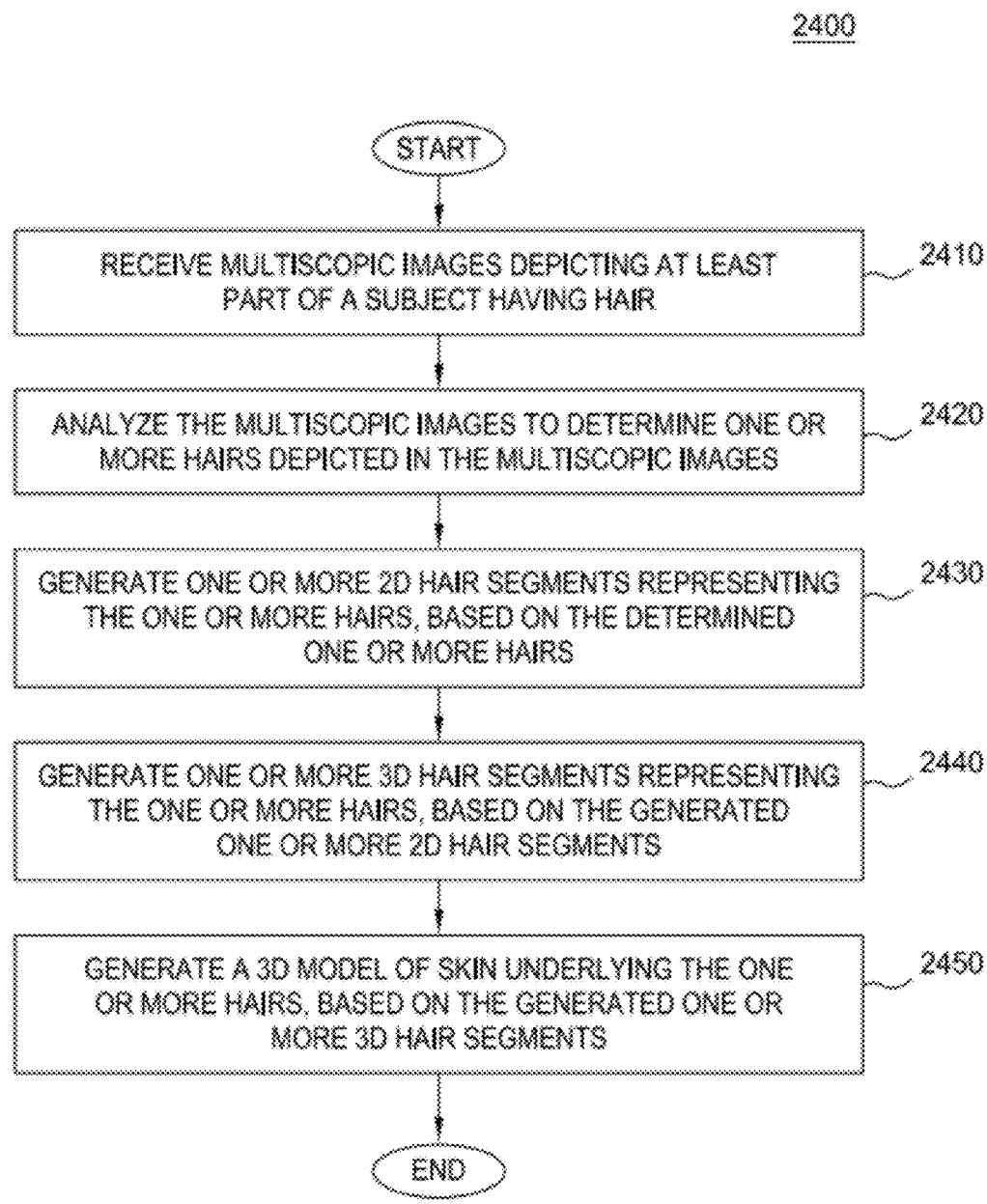
FIG. 24 is a flowchart depicting a method to model hair and skin, according to one aspect disclosed herein.

FIG. 24 is a flowchart depicting a method 2400 to model hair and skin, according to one aspect disclosed herein. As shown, the method 2400 begins at step 2410, where the processor receives multiscopic images depicting at least part of a subject having hair. At step 2420, the processor analyzes the multiscopic images to determine one or more hairs depicted in the multiscopic images. At step 2430, the processor generates one or more 2D hair segments representing the one or more hairs. In this regard, the 2D hair segments may be generated based on the determined one or more hairs. At step 2440, the processor generates one or more 3D hair segments representing the one or more hairs, based on the generated one or more 2D hair segments. At step 2450, the processor generates a 3D model of skin underlying the one or more hairs, based on the generated one or more 3D hair segments. At least in some embodiments, the processor may additionally generate a 3D model of skin not underlying the one or more hairs and proximate to the skin underlying the one or more hairs. The amount of skin generated in this regard may be tailored to suit the needs of a particular case. After the step 2450, the method 2400 terminates.

In some aspects, the techniques disclosed herein may be adapted to work in conjunction with other capture systems configured to capture a head of hair as a whole rather than at a granular hair level. The techniques may also be adapted to provide reliable results for source images having limited contrast, having limited dynamic range, and/or taken under varying lighting conditions. The hair synthesis operations disclosed herein may also be adapted to take into account hair shape and/or thickness in synthesizing hair. Further, as described above, the techniques may also be adapted to reconstruct, in 3D, other parts of the body, including the entire body. The presence of hair is a common characteristic of mammals and can be found in the soft coat of a cat, the wiry bristles of an elephant, and the dense, waterproof fur of a sea otter. Accordingly, the techniques may also be adapted to reconstruct, in 3D, mammals and other non-human species, in whole or in part.

Further, as described above, the techniques disclosed herein may more generally be adapted to reconstruct hair and/or skin for any subject including living or deceased biological organisms; artificial, physical models of biological organisms; and artificial, physical models of fictional or imaginary organisms. In still other embodiments, the subject may be an inanimate object, such as a mound of green grass, and the techniques disclosed herein may be adapted to reconstruct individual blades of grass and underlying soil. In this regard, the techniques disclosed herein may be applied to the mound of green grass in manner that treats the blades of grass as strands of hair and that treats the soil surface underlying the blades of grass as the skin underlying the strands of hair. As described above, the techniques disclosed herein may more generally be adapted to reconstruct filament and/or surface for any target and without departing from the scope of the present disclosure.

Accordingly, aspects disclosed herein provide techniques for coupled reconstruction of hair and skin, which provide accurate results in areas of high visibility and plausible results in areas of dense occlusion at least in some cases. Hair, and facial hair in particular, remains at the core of individual expression today, as evidenced by the ever-changing popularity of different styles of hair. By using the techniques disclosed herein, this and other aspects of popular culture may be captured more accurately and/or plausibly for various applications.

Various aspects disclosed herein may be implemented as a program product for use with a computer system. The program(s) of the program product define functions of the aspects (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Aspects have been described above with reference to specific aspects and numerous specific details are set forth to provide a more thorough understanding of the aspects disclosed herein. Persons skilled in the art, however, will understand that various modifications and changes may be made thereto without departing from the broader spirit and scope of the aspects disclosed herein. The foregoing description and drawings are, accordingly, to be regarded in an illustrative rather than a restrictive sense.

What is claimed is:

1. A computer-implemented method to model facial hair and skin, the computer-implemented method comprising:
 receiving a plurality of multiscopic images depicting at least part of a face of a subject having facial hair;
 analyzing the plurality of multiscopic images in order to determine correspondences between the plurality of multiscopic images and further determine one or more facial hairs depicted in the plurality of multiscopic images;
 generating a disparity map based on the correspondences, the disparity map containing one or more disparity values adjusted in directions of improved photometric-consistency and improved surface-consistency, respectively;
 generating a geometry mesh of the subject, based on the disparity map;
 generating one or more 3D facial hair segments representing the determined one or more facial hairs;
 generating a 3D model of facial skin underlying the one or more facial hairs, based on the generated one or more 3D facial hair segments and by operation of one or more computer processors; and
 generating a 3D model of the subject, based on the geometry mesh, the one or more 3D facial hair segments, and the 3D model of facial skin.

2. The computer-implemented method of claim 1, further comprising generating one or more 2D facial hair segments representing the one or more facial hairs, based on the determined one or more facial hairs, wherein the one or more 3D facial hair segments are generated based on the one or more 2D facial hair segments.

3. The computer-implemented method of claim 2, wherein generating the one or more 2D facial hair segments comprises:
 creating a facial hair map for each of the multiscopic images based on a filter kernel, wherein the facial hair map represents a likelihood of facial hair being present at each pixel of the respective multiscopic image; and
 creating the 2D facial hair segments based on the generated facial hair maps and further based on a 2D line growing algorithm.

4. The computer-implemented method of claim 3, wherein generating the one or more 3D facial hair segments comprises:
 creating a first one or more 3D facial hair segments by stereoscopically matching the 2D facial hair segments; and
 creating a second one or more 3D facial hair segments based on the first one or more 3D facial hair segments and further based on a 3D line growing algorithm, wherein one or more outlying 3D facial hair segments is removed from the second one or more 3D facial hair segments.

5. A non-transitory computer-readable medium containing a program which, when executed, performs an operation to model facial hair and skin, the operation comprising:
 receiving a plurality of multiscopic images depicting at least part of a face of a subject having facial hair;
 analyzing the plurality of multiscopic images in order to determine correspondences between the plurality of multiscopic images and further determine one or more facial hairs depicted in the plurality of multiscopic images;
 generating a disparity map based on the correspondences, the disparity map containing one or more disparity values adjusted in directions of improved photometric-consistency and improved surface-consistency, respectively;
 generating a geometry mesh of the subject, based on the disparity map;
 generating one or more 3D facial hair segments representing the determined one or more facial hairs;
 generating a 3D model of facial skin underlying the one or more facial hairs, based on the generated one or more 3D facial hair segments and by operation of one or more computer processors when executing the program; and
 generating a 3D model of the subject, based on the geometry mesh, the one or more 3D facial hair segments, and the 3D model of facial skin.

6. The non-transitory computer-readable medium of claim 5, wherein the operation further comprises generating one or more 2D facial hair segments representing the one or more facial hairs, based on the determined one or more facial hairs, wherein the one or more 3D facial hair segments are generated based on the one or more 2D facial hair segments.

7. The non-transitory computer-readable medium of claim 6, wherein generating the one or more 2D facial hair segments comprises:
 creating a facial hair map for each of the multiscopic images based on a filter kernel, wherein the facial hair map represents a likelihood of facial hair being present at each pixel of the respective multiscopic image; and
 creating the 2D facial hair segments based on the generated facial hair maps and further based on a 2D line growing algorithm.

8. The non-transitory computer-readable medium of claim 7, wherein generating the one or more 3D facial hair segments comprises:
 creating a first one or more 3D facial hair segments by stereoscopically matching the 2D facial hair segments; and
 creating a second one or more 3D facial hair segments based on the first one or more 3D facial hair segments and further based on a 3D line growing algorithm, wherein one or more outlying 3D facial hair segments is removed from the second one or more 3D facial hair segments.

9. A system to model facial hair and skin, the system comprising:
 one or more computer processors;
 a memory containing a program which, when executed by the one or more computer processors, performs an operation comprising:
  receiving a plurality of multiscopic images depicting at least part of a face of a subject having facial hair;
  analyzing the plurality of multiscopic images in order to determine correspondences between the plurality of multiscopic images and further determine one or more hairs depicted in the plurality of multiscopic images;
  generating a disparity map based on the correspondences, the disparity map containing one or more disparity values adjusted in a directions of improved photometric-consistency and improved surface-consistency, respectively;
  generating a geometry mesh of the subject, based on the disparity map;

generating one or more 3D hair segments representing the determined one or more hairs;

generating a 3D model of skin underlying the one or more hairs, based on the generated one or more 3D hair segments; and generating a 3D model of the subject, based on the geometry mesh, the one or more 3D facial hair segments, and the 3D model of facial skin.

10. The system of claim 9, wherein the operation further comprises generating one or more 2D facial hair segments representing the one or more facial hairs, based on the determined one or more facial hairs, wherein the one or more 3D facial hair segments are generated based on the one or more 2D facial hair segments.

11. The system of claim 10, wherein generating the one or more 2D facial hair segments comprises:

creating a facial hair map for each of the multiscopic images based on a filter kernel, wherein the facial hair map represents a likelihood of facial hair being present at each pixel of the respective multiscopic image; and creating the 2D facial hair segments based on the generated facial hair maps and further based on a 2D line growing algorithm.

12. The system of claim 11, wherein generating the one or more 3D facial hair segments comprises:

creating a first one or more 3D facial hair segments by stereoscopically matching the 2D facial hair segments; and creating a second one or more 3D facial hair segments based on the first one or more 3D facial hair segments and further based on a 3D line growing algorithm.

13. The system of claim 12, wherein one or more outlying 3D facial hair segments is removed from the second one or more 3D facial hair segments.

14. The system of claim 13, wherein generating the 3D model of facial skin comprises:

creating a model of visible facial skin episurface by performing masking and inpainting;

creating a model of hidden facial skin episurface based on performing a least-squares fitting to determine surface positions and normals for facial hair roots of the one or more 3D facial hair segments; and creating the 3D model of facial skin based on the model of visible facial skin episurface and the model of hidden facial skin episurface;

wherein the operation further comprises:

generating one or more additional 3D facial hair segments based on the generated 3D model of facial skin, based on one or more seed points determined for the one or more additional 3D facial hair segments; and generating a 3D model of facial skin not underlying the one or more facial hairs.

15. The system of claim 14, wherein the correspondences between the plurality of multiscopic images are determined based on stereo reconstruction that provides an initial estimate of the disparity map, wherein the direction of improved surface-consistency is determined using a smoothing term having a second-order anisotropic formulation.

16. The system of claim 15, wherein the stereo reconstruction is implemented based on the plurality of multiscopic images of the subject that are used to generate the geometry mesh, wherein implementing the stereo reconstruction comprises:

rectifying the plurality of multiscopic images of the subject;

applying a high-pass filter to the plurality of multiscopic images of the subject to extract high spatial frequency features; and performing stereo matching based on the high spatial frequency features;

wherein generating the three-dimensional model of the subject further comprises determining a first set of mesoscopic details associated with the subject by applying a filter to a first image of the plurality of multiscopic images of the subject, wherein mesoscopic details included in the first set of mesoscopic details are detectable in the image of the subject and are not reconstructable when generating the geometry mesh of the subject;

wherein the filter corresponds to a range of spatial frequencies that is associated with the first set of mesoscopic details, wherein generating the three-dimensional model of the subject further comprises modulating a refinement of the geometry mesh, based on photometric consistency and surface consistency, with the first set of mesoscopic details;

wherein the refinement of the geometry mesh is modulated with the first set of mesoscopic details and based on a mesoscopic consistency term, wherein the at least part of the subject comprises a human head.

17. The system of claim 16, wherein the operation further comprises performing mesoscopic geometry modulation based on coarse geometry modulation without depth estimation and without geometric normal estimation, including:

providing a plurality of filters including, for each type of a plurality of different types of mesoscopic detail depicted in the first image of the subject, a respective filter configured to detect the respective type of mesoscopic detail based on a respective range of spatial frequencies, wherein each type of mesoscopic detail is detectable in the first image of the subject and are not detectable when generating a coarse geometry reconstruction of the subject;

applying each of the plurality of filters to first the image of the subject in order to obtain a respective filtered result of a plurality of filtered results, in order to determine, based on the plurality of filtered results, at least one filter of the plurality of filters that, when applied to the first image of the subject, indicates existence of a set containing at least one of the respective type of mesoscopic detail in the first image of the subject; and wherein the three-dimensional model for the subject is generated by modulating the coarse geometry with the respective set of mesoscopic details corresponding to each of the at least one filter without any depth estimation and without direct geometric normal estimation of the first set of mesoscopic details.

18. The system of claim 17, wherein the three-dimensional model is generated for the subject by an application, wherein the application is configured to independently incur, in generating the three-dimensional model for the subject, a lower processing cost than each individual estimation selected from: (i) depth estimation and (ii) geometric normal estimation; wherein performing mesoscopic geometry modulation further comprises determining the coarse geometry by performing stereo reconstruction based on the plurality of multiscopic images of the subject;

wherein modulating the coarse geometry with the respective sets of mesoscopic details comprises performing an estimated normal displacement operation comprising:

computing a macroscopic normal for each mesoscopic detail in the respective set of mesoscopic details; and modulating the coarse geometry along the computed macroscopic normals to introduce mesoscopic surface variation in order to implicitly produce a respective mesoscopic normal for each mesoscopic detail in the respective set of mesoscopic details;

wherein modulating the coarse geometry with the respective set of mesoscopic details comprises scaling the mesoscopic details by a first scale factor, wherein each range of spatial frequencies is distinct;

wherein performing mesoscopic geometry modulation further comprises scaling each set of mesoscopic details by a respective scale factor when modulating the coarse geometry;

wherein the range of spatial frequencies of each filter is computed based on, in respective instances, each of: a resolution associated with the image of the subject, a distance between the subject and a camera used to capture the image of the subject, and a size of the mesoscopic details included in the respective set of mesoscopic details, wherein the types of mesoscopic details comprise spots, freckles, moles, pores, fine wrinkles, and facial hair.

19. The system of claim 18, wherein generating the geometry mesh for the subject includes the rectifying of the plurality of multiscopic images and further includes:

for each of a plurality of image pyramid levels of a disparity pyramid associated with the plurality of multiscopic images, performing a stereo matching operation, an optimization operation, and a regularization and fairing operation; and performing a triangulation operation on the plurality of multiscopic images in order to create the geometry mesh for the subject;

wherein the optimization operation includes disparity map optimization and surface optimization, wherein the disparity map optimization includes an iterative refinement of disparity using photometric consistency according to a first predefined equation and further using surface consistency according to a second predefined equation;

wherein the disparity map optimization entails updating disparity values as a linear combination based on a user-specified weighting scalar that controls smoothness.

20. The system of claim 19, wherein the operation further comprises performing mesoscopic optimization on the geometry mesh for the subject, including computing mesoscopic values using a projection of a Gaussian N and according to a fourth predefined equation;

wherein the mesoscopic values comprise high-pass filtered values, wherein the operation further comprises computing a resolution parameter for at least a first mesoscopic value and according to a fifth predefined equation;

wherein the operation further comprises computing a weight for the first mesoscopic value and according to a sixth predefined equation;

wherein the operation further comprises identifying an orientation that produces a highest score at a given pixel, according to a seventh predefined equation;

wherein the identified orientation is stored in an orientation map, wherein the operation further comprises generating a hair map using a binary map and according to an eighth predefined equation;

wherein creating the 2D facial hair segments includes determining a score for each potential growth direction in a growth cone and according to a ninth predefined equation.

21. The system of claim 20, wherein generating the one or more 3D facial hair segments includes computing a matching score from the hair map using the function $\psi$ and according to tenth predefined equation;

wherein the operation further includes performing a refinement operation on the one or more 3D facial hair segments, including determining a refined position as a weighted average of two predefined positions, and according to an eleventh predefined equation;

wherein creating the second one or more 3D facial hair segments based on the 3D line growing algorithm includes determining, for each potential segment of the growth cone with direction w, a score using all of a plurality of cameras for which the respective potential segment is expected to be visible and according to a twelfth predefined equation;

wherein the operation further includes performing a hair synthesis operation subsequent to creating the 3D model of facial skin, the hair synthesis operation including designating a vertex as a hair seed only upon a predefined condition being fulfilled.

22. A computer-implemented method to model filament and surface, the computer-implemented method comprising:

receiving a plurality of multiscopic images depicting at least part of a target having at least one filament;

analyzing the plurality of multiscopic images in order to determine correspondences between the plurality of multiscopic images and further determine one or more filaments depicted in the plurality of multiscopic images;

generating a disparity map based on the correspondences, the disparity map containing one or more disparity values adjusted in directions of improved photometric-consistency and improved surface-consistency, respectively;

generating a geometry mesh of the target, based on the disparity map;

generating, based on the determined one or more filaments, one or more 2D filament segments representing the one or more filaments;

generating, based on the one or more 2D filament segments, one or more 3D filament segments representing the determined one or more filaments;

generating a 3D model of surface underlying the one or more filaments, based on the generated one or more 3D filament segments and by operation of one or more computer processors; and generating a 3D model of the target, based on the geometry mesh, the one or more 3D filament segments, and the 3D model of surface underlying the one or more filaments.

* * * * *